US012550041B2

United States Patent
Uhling et al.

(10) Patent No.: US 12,550,041 B2
(45) Date of Patent: Feb. 10, 2026

(54) NETWORK PROTOCOL FOR BATTERY POWERED DEVICES WITHIN A WIRELESS NETWORK

(71) Applicant: ITRON, INC., Liberty Lake, WA (US)

(72) Inventors: Thomas F. Uhling, Spokane Valley, WA (US); Keith Wayne Barnes, Waseca, MN (US); Howard Neal Brace, Waseca, MN (US); Imad Jamil, Beynes (FR); Fabrice Monier, Bry sur Marne (FR)

(73) Assignee: ITRON, INC., Liberty Lake, WA (US)

( * ) Notice: Subject to any disclaimer, the term of this patent is extended or adjusted under 35 U.S.C. 154(b) by 385 days.

(21) Appl. No.: 18/296,850

(22) Filed: Apr. 6, 2023

(65) Prior Publication Data

US 2023/0247520 A1 Aug. 3, 2023

Related U.S. Application Data

(63) Continuation of application No. 17/245,420, filed on Apr. 30, 2021, now Pat. No. 11,641,615.

(51) Int. Cl.
*H04W 40/24* (2009.01)
*H04W 24/02* (2009.01)

(52) U.S. Cl.
CPC ........ *H04W 40/246* (2013.01); *H04W 24/02* (2013.01)

(58) Field of Classification Search
None
See application file for complete search history.

(56) References Cited

U.S. PATENT DOCUMENTS

| 8,644,186 | B1 | 2/2014 | Boers et al. |
| 10,129,745 | B2 * | 11/2018 | Lv .......................... H04L 67/104 |
| 11,363,675 | B2 * | 6/2022 | Wu .......................... H04L 45/48 |
| 2006/0268749 | A1 * | 11/2006 | Rahman ................... H04L 45/48 370/256 |
| 2009/0190521 | A1 * | 7/2009 | Horn ..................... H04W 40/30 370/315 |
| 2009/0323709 | A1 | 12/2009 | Thubert et al. |
| 2013/0094404 | A1 | 4/2013 | Van Wyk et al. |
| 2014/0126426 | A1 | 5/2014 | Vasseur et al. |
| 2016/0080416 | A1 | 3/2016 | Purohit |

(Continued)

FOREIGN PATENT DOCUMENTS

| WO | 2014/040053 A1 | 3/2014 |
| WO | 2020/214469 A1 | 10/2020 |

OTHER PUBLICATIONS

Extended European Search Report for Application No. 22796664.5 dated Dec. 3, 2024.

(Continued)

*Primary Examiner* — Brian S Roberts
(74) *Attorney, Agent, or Firm* — Artegis Law Group, LLP

(57) ABSTRACT

A network system implements a network protocol for devices and nodes within a wireless network. A first node within a subtree of nodes in the wireless network performs a method including receiving a discovery request from a second node included in the wireless network, determining that an address associated with the second node is not included in a first address list that includes addresses of nodes along a node path between the first node and a root node of the subtree of nodes, and sending, in response to the determining, a response to the discovery request.

20 Claims, 14 Drawing Sheets

(56) References Cited

U.S. PATENT DOCUMENTS

| | | |
|---|---|---|
| 2016/0134161 A1 | 5/2016 | Hui et al. |
| 2019/0004587 A1 | 1/2019 | Van Wyk et al. |
| 2020/0025629 A1 | 1/2020 | Zinger et al. |
| 2020/0099543 A1 | 3/2020 | Taylor et al. |
| 2020/0145897 A1* | 5/2020 | Jin .......................... H04W 4/38 |
| 2021/0100055 A1 | 4/2021 | Liu et al. |
| 2021/0118068 A1 | 4/2021 | Deshmukh |

OTHER PUBLICATIONS

Extended European Search Report for Application No. 22796665.2 dated Dec. 3, 2024.

Oliveira et al., "Low-power and Lossy Networks under Mobility: A Survey", Computer Networks, http://dx.doi.org/10.1016/j.comnet.2016.03.018, vol. 107, Apr. 8, 2016, pp. 339-352.

Vasseur et al., "RPL: The IP Routing Protocol Designed for Low Power and Lossy Networks", Internet Protocol for Smart Objects (IPSO) Alliance, Apr. 2011, 20 pages.

Non Final Office Action received for U.S. Appl. No. 18/349,286 dated Feb. 28, 2024, 11 pages.

Notice of Allowance received for U.S. Appl. No. 18/349,286 dated Sep. 3, 2024, 5 pages.

Final Office Action received for U.S. Appl. No. 18/349,286 dated Jun. 21, 2024, 7 pages.

* cited by examiner

261

| Row 405 | MAC Address 410 | Parent MAC Address 415 | Timestamp 420 |
|---|---|---|---|
| 1 | B | A | 2526 |
| 2 | C | B | 2555 |
| 3 | D | A | 2546 |
| 4 | E | B | 2221 |
| 5 | F | C | 2290 |
| 6 | G | D | 2518 |
| 7 | H | F | 2441 |

NETWORK PROTOCOL FOR BATTERY POWERED DEVICES WITHIN A WIRELESS NETWORK

CROSS-REFERENCE TO RELATED APPLICATIONS

The present application is a continuation of United States application titled "NETWORK PROTOCOL FOR BATTERY POWERED DEVICES WITHIN A WIRELESS NETWORK," filed on Apr. 30, 2021, and having Ser. No. 17/245,420. The subject matter of this related application is hereby incorporated herein by reference.

BACKGROUND

Field of the Various Embodiments

Various embodiments of the present disclosure relate generally to wireless network communications and, more specifically, to a network protocol for battery powered devices within a wireless network.

Description of the Related Art

A conventional wireless network includes a plurality of nodes configured to communicate with one another. In certain types of heterogeneous wireless networks, different types of nodes communicate and interact with one another within the network, including mains powered device (MPD) nodes and battery powered device (BPD) nodes. MPD nodes typically are coupled to a power grid and have continuous access to power (except during power outages), which allows MPD nodes to receive and transmit data more or less continuously. On the other hand, BPD nodes are powered by batteries and therefore have only a finite supply of power. To manage the finite supply of power, BPD nodes normally remain in a powered-down state and power on only at intermittent intervals.

A conventional network protocol is implemented in a heterogeneous wireless network to define and manage the various functions of the nodes. Because conventional network protocols are usually configured and optimized for managing the functions of mains powered nodes, those protocols typically define and manage the various functions of nodes without accounting for any battery life requirements the nodes may have. Accordingly, using conventional network protocols to define and manage the functions of BPD nodes, which have a finite supply of power and limited battery life, has several drawbacks.

First, conventional network protocols typically enable large and complex subtrees of nodes within a given wireless network. In particular, conventional network protocols normally allow a relatively high maximum number of nodes and a relatively high maximum number of hops within a given subtree. In addition, conventional network protocols normally permit a node within a given subtree to have multiple parent nodes. Because MPD nodes have continuous access to power, an MPD node usually can function properly as the root node of a large and complex subtree within a wireless network and effectively manage the subtree via a conventional network protocol. By contrast, a BPD node usually cannot function properly as the root node of a large and complex subtree within a wireless network because the limited amount of battery power available to the BPD node can be depleted quickly when managing the subtree, as well as routing messages to and from the subtree via a conventional network protocol. Thus, one drawback of implementing conventional network protocols in heterogeneous wireless networks is that conventional network protocols enable large and complex subtrees of nodes within wireless networks that cannot be effectively managed by BPD nodes without depleting the limited amounts of battery power available to the BPD nodes.

Second, because conventional network protocols permit large and complex subtrees of nodes within wireless networks, conventional network protocols often times also define many complex functions that require significant amounts of power to execute. For example, a conventional network protocol typically defines complex functions for managing a given subtree, adding a node to a subtree, routing messages within a subtree, and loop management within a subtree. While an MPD node may execute such complex functions without issue, a BPD node can expend a significant amount of a limited battery power supply executing such complex functions.

In summary, conventional network protocols implemented in heterogeneous wireless networks are typically configured and optimized for execution by the MPD nodes within those networks. By contrast, conventional network protocols are not typically configured and optimized for the BPD nodes within those networks. Consequently, BPD nodes can consume excessive amounts of power when executing conventional network protocols, which can shorten the operating lifetimes of BPD node and result in expensive repair and/or replacement costs.

As the foregoing illustrates, what is needed in the art are more effective techniques for defining and managing the functions of battery powered devices within wireless networks.

SUMMARY

Some embodiments include a computer-implemented method for performing node-based operations within a wireless network, including connecting a root battery powered device (BPD) node to a main powered device (MPD) node that resides within a main network of the wireless network, wherein the main network implements a first network protocol, connecting the root BPD node to one or more descendant BPD nodes, wherein the root BPD node and the one or more descendant BPD nodes comprise a BPD subtree within the wireless network, and performing one or more operations at the root BPD node based on a second network protocol that is different than the first network protocol.

Some embodiments include a computer-implemented method for performing node-based operations within a wireless network, including identifying a network address that is associated with a first battery powered device (BPD) node included in a subtree of BPD nodes within the wireless network, identifying an address list that is associated with a second BPD node included in the subtree of BPD nodes, wherein the address list includes a node path between the second BPD node and a root node of the subtree of BPD nodes, and determining whether the first BPD node and the second BPD node are included in a potential node loop or a formed node loop based on the network address associated with the first BPD node and the address list associated with the second BPD node.

At least one technical advantage of the disclosed techniques relative to the prior art is that, with the disclosed techniques, a custom network protocol configured and optimized for BPD nodes can be implemented within a wireless network. Among other things, the custom network protocol permits smaller and simpler subtrees of nodes to be set up within the wireless network relative to what is permitted by conventional network protocols. As a result, BPD nodes can function properly as the root nodes of the subtrees formed within the wireless network and can manage and route messages to and from the subtrees using less power than required under conventional network protocols. Another technical advantage of the disclosed techniques is that, because the custom network protocol permits smaller and simpler subtrees of BPD nodes within the wireless network, the custom network protocol also defines node functions, such as discovery, messaging, and loop management functions, that are less complex than those defined under conventional network protocols. As a result, the BPD nodes of a given subtree can execute those functions using less power than required under conventional network protocols. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4 is a conceptual diagram of a routing table generated for the BPD subtree of FIG. 3, according to various embodiments;

DETAILED DESCRIPTION

In the following description, numerous specific details are set forth to provide a more thorough understanding of the various embodiments. However, it will be apparent to one of skilled in the art that the inventive concepts can be practiced without one or more of these specific details.

The disclosed techniques apply to any system of networked devices/nodes, where at least some devices/nodes are battery powered. Such systems include a wireless network of utility meter devices, Internet of things (IoT) devices, and/or the like. As noted above, conventional network protocols implemented by a conventional wireless network suffers from numerous inefficiencies. Among other things, conventional network protocols permit large and complex subtrees that are difficult to manage by root BPD nodes due to the substantial power requirements needed to manage such large and complex subtrees. In addition, conventional network protocols define complex functions that expend a significant amount of energy when executed by the BPD nodes. As a result, BPD nodes consume excessive energy when executing the conventional network protocols, which shortens the operational lifetime of BPD nodes, leading to leading to expensive repair and/or replacement costs.

To address these issues, various embodiments include a custom network protocol that is configured and optimized for BPD nodes and BPD subtrees within a wireless network. In particular, the custom network protocol permits only smaller and simpler subtrees relative to the larger and more complex subtrees permitted in conventional network protocols. As a result, the custom network protocol can also define various functions that are less complex relative to the corresponding functions defined in conventional network protocols. For example, the various functions defined by the custom network protocol can include management of the subtree, adding a node to the subtree, routing messages within the subtree, and loop management within the subtree. Each BPD node can conserve energy when executing these simplified functions defined by the custom network protocol, relative to executing the corresponding complex functions that are defined by conventional network protocols. An overview of the system according to the present disclosure is now described.

System Overview

Figure 1:
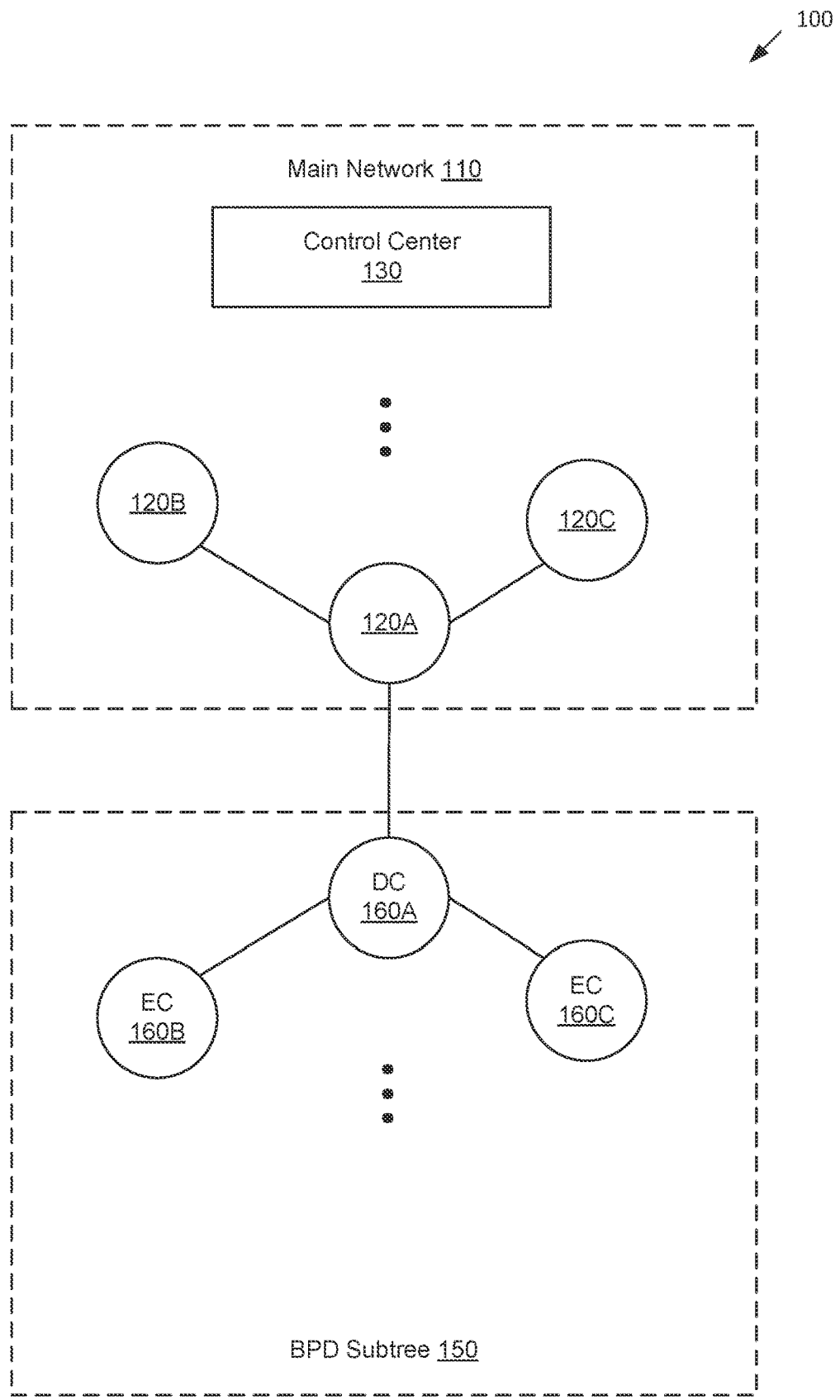
FIG. 1 illustrates a network system configured to implement one or more aspects of the various embodiments.

FIG. 1 illustrates a network system configured to implement one or more aspects of the various embodiments. The network system 100 can comprise any type of network, such as a wide area network (WAN), field area network (FAN), personal area network (PAN), the Internet, and the like. The network system 100 can be organized according to any network topology, including a mesh network topology, a star network topology, a ring network topology, and/or the like. Further, the network system 100 can be organized according to a hybrid network topology based on any technically feasible combination of a mesh network topology, a star network topology, a ring network topology, and/or the like. As shown, the network system 100 includes a main network 110 and a BPD subtree 150.

The main network 110 includes a plurality of interconnected mains powered device (MPD) nodes 120, such as 120A, 120B, 120C, etc. The BPD subtree 150 includes a plurality of interconnected battery powered device (BPD)

nodes 160, such as 160A, 160B, 160C, etc. MPD nodes 120 draw power from an external power source, such as mains electricity or a power grid. As such, MPD nodes 120 can be considered continuously-powered nodes and non-limited energy devices. MPD nodes 120 typically operate on a continuous basis without powering down for extended periods of time. In contrast, BPD nodes 160 draw power from an internal power source, such as a battery. BPD nodes 160 typically operate intermittently and power down for extended periods of time in order to conserve battery power. As such, BPD nodes 160 can be considered low energy/power nodes or limited energy devices. MPD nodes 120 and BPD nodes 160 are configured to gather sensor data, process the sensor data, and communicate data processing results and other information to a control center 130 in the main network 110. The MPD nodes 120 and BPD nodes 160 are configured to communicate directly with one or more adjacent nodes via bi-directional communication links (as represented by interconnecting lines between the nodes). The communication links can be wired or wireless links that allow data exchange, such as wireless radio frequency (RF) communications, wireless (Wi-Fi) network, Bluetooth, Wireless USB, among others.

Control center 130 includes one or more server machines (not shown) configured to operate as sources for, or destinations of, data packets that traverse within network system 100. The server machines can query nodes within network system 100 to obtain various data, including raw or processed sensor data, energy consumption data, node/network throughput data, status information, and so forth. The server machines can also transmit commands and/or program instructions to any node within network system 100 to cause those nodes to perform various operations. In one embodiment, each server machine is a computing device configured to execute, via a processor, a software application stored in a memory to perform various network management operations.

The main network 110 implements a conventional network protocol that is configured and optimized for mains powered devices. Conventional network protocols are typically not designed for battery powered devices and the limited amount of power available to the battery powered devices. Conventional network protocols typically allow large and complex subtrees, and as a result, define complex functions for managing and operating the subtrees. In a conventional network system, the underlying conventional network protocol implemented in the main network 110 is also implemented in the BPD subtree 150. However, implementing a conventional network protocol in a BPD subtree 150 can quickly deplete the power reserves of the BPD nodes 160 in the subtree 150. To address these drawbacks of conventional network protocols, a novel custom network protocol is implemented within the BPD subtree 150, as discussed in the embodiments herein.

The BPD subtree 150 comprises a subtree of a plurality of BPD nodes within the network system 100. The BPD subtree 150 can be represented as a sub-destination oriented directed acyclic graph (DODAGG) of the network system 100. The BPD subtree 150 is attached to at least one MPD node of the main network 110. As shown, the BPD subtree 150 includes a single root BPD node 160A and one or more descendant BPD nodes of the root BPD node 160A, such as 160B, 160C, etc.

The root BPD node 160A is directly connected to the main network 110 via at least one main network component 120A (such as an MPD node, cellular tower, or eNodeB) within the main network 110. In some embodiments, the root BPD node 160A is directly connected to the main network 110 via at least one main network component comprising an MPD node within the main network 110, such as MPD node 120A (referred to herein as a connecting MPD node). In other embodiments, the main network 110 comprises a cellular network that includes a main network component 120A comprising a cellular tower and/or eNodeB. In these embodiments, the root BPD node 160A includes a cellular modem for connecting with the cellular tower and/or eNodeB within the cellular network. In this manner, the root BPD node 160A is directly connected to the cellular network (main network 110) via at least one main network component 120A comprising a cellular tower or eNodeB within the cellular network (main network 110).

The root BPD node 160A of the BPD subtree 150 is referred to herein as the direct connected (DC) node 160A. Each descendant BPD node is connected to the DC node 160A, or to another descendant BPD node within the subtree 150. Therefore, a descendant BPD node can comprise a child of the DC node 160A, grandchild of the DC node 160A, great-grandchild of the DC node 160A, and so forth. A descendant BPD node of the DC node 160A is referred to herein as an extended child (EC) node of the DC node.

Figure 2:
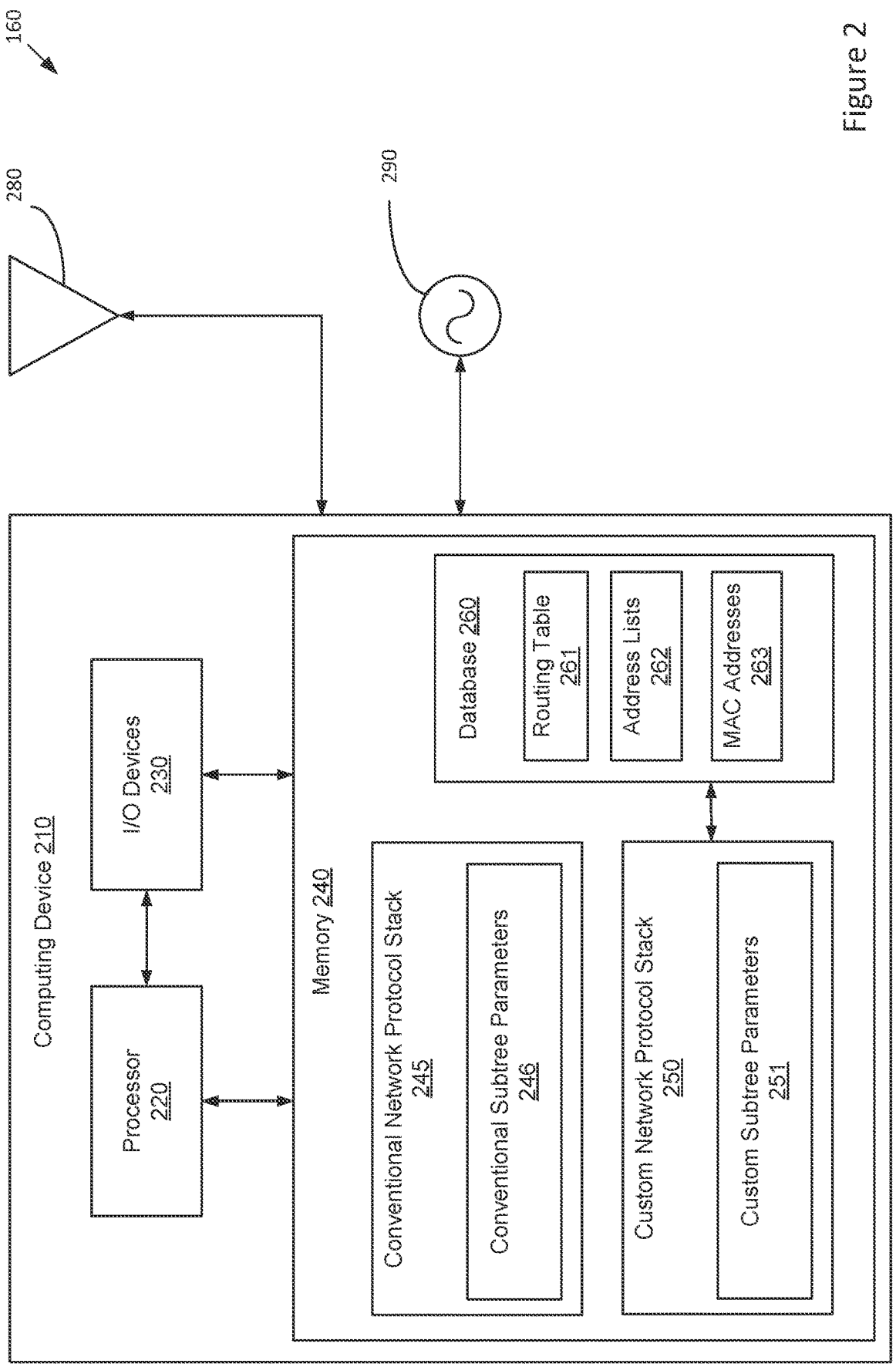
FIG. 2 illustrates a BPD node configured to operate within the network system of FIG. 1, according to various embodiments.

Each BPD node 160 includes computing device hardware configured to perform processing operations and execute program code. FIG. 2 illustrates a BPD node 160 configured to operate within the network system 100 of FIG. 1, according to various embodiments. As shown, a BPD node 160 includes a computing device 210 coupled to a transceiver 280 and an oscillator 290. Computing device 210 coordinates the operations of the BPD node 160. Transceiver 280 is configured to transmit and receive message data packets across network system 100 using a range of channels and power levels. Oscillator 290 provides one or more oscillation signals according to which the transmission and reception of message data packets can be scheduled. Each BPD node 160 can further include various analog-to-digital and digital-to-analog converters, digital signal processors (DSPs), harmonic oscillators, transceivers, and any other components generally associated with RF-based communication hardware (not shown).

Computing device 210 includes a processor 220, input/output (I/O) devices 230, and memory 240, coupled together. Processor 220 can include any hardware configured to process data and execute software applications. In general, processor 220 retrieves and executes programming instructions stored in memory 240. Processor 220 can be any technically feasible form of processing device configured to process data and execute program instructions. Processor 220 could be, for example, one or more central processing units (CPUs), digital signal processors (DSPs), graphics processing units (GPUs), application-specific integrated circuits (ASICs), field-programmable gate arrays (FPGAs), and/or the like. Processor 220 stores and retrieves application data residing in the memory 240. Processor 220 is included to be representative of a single processor, multiple processors, a single processor having multiple processing cores, and the like. In operation, processor 220 is the master processor of BPD node 160, controlling and coordinating operations of other system components. Memory 240 stores software applications and data for use by processor 220. Processor 220 executes software applications and programs, stored within memory 240 and optionally an operating system. In particular, processor 220 executes software instructions and then performs one or more of the functions and operations set forth in the present application.

Processor 220 can include a real-time clock (RTC) (not shown) according to which processor 220 maintains an estimate of the current time. I/O devices 230 include devices configured to receive input, devices configured to provide output, and devices configured to both receive input and provide output. Memory 240 can be implemented by any technically feasible storage medium.

Memory 240 stores software programs including, without limitation, a conventional network protocol stack 245, a custom network protocol stack 250, and a database 260. The conventional network protocol stack 245 and custom network protocol stack 250 each include program instructions that, when executed by processor 220, performs any one or more of the computer-based techniques described herein. The conventional network protocol stack 245 and/or custom network protocol stack 250 can interface with transceiver 280 to coordinate the transmission and reception of message data packets across network system 100 based on timing signals generated by oscillator 290. Database 260 can include various data and data structures retrieved by and/or stored by the conventional network protocol stack 245 and the custom network protocol stack 250. For example, the database 260 can include a routing table 261, one or more address lists 262 (such as the parent address list of the parent node and the address list of the node), and various media access control (MAC) addresses 263 (such as the MAC address of the node, the MAC address of the parent node, the MAC address of each child node, etc.).

The conventional network protocol stack 245 provides a conventional network protocol that is implemented in the main network 110. Examples of the conventional network protocol stack 245 include layer 2 protocol stacks, a cellular protocol stack, and the like. In some embodiments, the memory 240 includes two or more different conventional network protocol stacks 245. The conventional network protocol stack 245 provides a set of conventional subtree parameters 246 for managing subtrees of nodes within the main network 110. The set of conventional subtree parameters 246 define a structure of a subtree in the main network 100. For example, the conventional subtree parameters 246 can specify a maximum number of nodes permitted within each subtree, a maximum number of node hops permitted within each subtree, and a maximum number of parent nodes permitted for each node in the subtree. The conventional network protocol and conventional subtree parameters 246 are configured and designed for MPD nodes and are not designed specifically for power efficiency.

The custom network protocol stack 250 provides a custom network protocol that is implemented in the BPD subtree 150. For example, the custom network protocol stack 250 can be executed by one or more of the BPD nodes 160 to manage the BPD subtree 150, communicate between the BPD nodes 160, and perform various functions. The custom network protocol stack 250 provides a set of custom subtree parameters 251 for managing subtrees of nodes within the main network 110. The set of custom subtree parameters 251 define a structure of the BPD subtree 150, and are different than the set of conventional subtree parameters 246. The custom network protocol and custom subtree parameters 251 are configured and optimized for BPD nodes and take into consideration the limited amount of power available to the BPD nodes. In particular, the custom subtree parameters 251 can be determined and set by an engineer/user based on the battery power characteristics of the BPD nodes. For example, the custom subtree parameters 251 can be determined based on the battery capacity and/or predicted battery life of a battery power source (not shown) of the BPD node 160.

Advantageously, the custom subtree parameters 251 permit BPD subtrees that are considerably smaller and less complex than the subtrees permitted by conventional subtree parameters 246. For example, the conventional subtree parameters 246 can specify a first maximum number of nodes (such as 500, 1000, or 1500) permitted within each subtree and the custom subtree parameters 251 can specify a second maximum number of nodes (such as 10, 15, or 20) permitted within each subtree, wherein the second maximum number of nodes is less than the first maximum number of nodes. Also, the conventional subtree parameters 246 can specify a first maximum number of node hops (such as 10, 20, or 25) permitted within each subtree and the custom subtree parameters 251 can specify a second maximum number of node hops (such as 3, 4, or 5) permitted within each subtree, wherein the second maximum number of node hops is less than the first maximum number of node hops. Further, the conventional subtree parameters 246 can specify that each node in the subtree can have a plurality of different parent nodes (such as 3, 4, or 5), whereas the custom subtree parameters 251 can specify that each node in the subtree can only have a single parent node (referred to herein as the single parent requirement).

By only permitting smaller and simpler BPD subtrees, the custom network protocol stack 250 can thereby define various functions of the custom network protocol that are considerably less complex than the corresponding functions of the conventional network protocol. For example, the custom network protocol stack 250 can define functions for managing a BPD subtree, discovery within the BPD subtree, adding a node to the BPD subtree, routing messages within the BPD subtree, and loop management within the BPD subtree that are considerably less complex than the corresponding functions of the conventional network protocol.

The DC node 160A of the subtree 150 can store and execute both the conventional network protocol stack 245 and the custom network protocol stack 250 to connect and communicate with both the main network 110 and the BPD subtree 150. For example, the DC node 160A of the subtree 150 can execute the conventional network protocol stack 245 based on the conventional subtree parameters 246 to connect and communicate with an MPD node 120A of the main network 110. The DC node 160A (discovering node) can perform a discovery process/function with the MPD node 120A (potential parent node) to discover and connect with the MPD node 120A. Each of the DC node 160A and the MPD node 120A execute the conventional network protocol stack 245 based on the conventional subtree parameters 246 to implement the discovery process/function, which is defined by the conventional network protocol. The DC node 160A also executes the custom network protocol stack 250 based on the custom subtree parameters 251 to manage and communicate with the various BPD nodes 160 of the BPD subtree 150 in accordance with the custom network protocol. In some embodiments, the DC node 160A also produces and maintains a routing table 261 in the database 260 to assist in the managing of the subtree 150, as discussed below in in relation to FIG. 4.

In this manner, the DC node 160A can connect and communicate with both the main network 110 and the BPD subtree 150, and act as the interface between the main network 110 and the BPD subtree 150. The DC node 160A can connect and communicate with any type of main network 110 by storing and executing the conventional network protocol stack 245 implemented by the main network 110. The custom network protocol that is also executed by the DC node 160A is configured to operate independently from the conventional network protocol implemented by the main network 110. In this regard, the custom network protocol is agnostic to the conventional network protocol implemented by the main network 110, and does not need to be modified for different types of conventional network protocols.

A BPD node 160 comprising an EC node (such as 160B and 160C) of the subtree 150 can store and execute the custom network protocol stack 250 to connect and communicate with other BPD nodes within the BPD subtree 150 and perform various functions defined by the custom network protocol. Each EC node produces and maintains one or more address lists 262 in the database 260 to assist in performing some of the functions defined by custom network protocol, as discussed below in in relation to FIG. 10. In some embodiments, an EC node can become a DC node for a new BPD subtree 150 in particular situations. For example, an EC node can lose connection with a DC node 160A and then migrate to connect to an MPD node 120 of the main network 110. In these embodiments, each EC node can also store the conventional network protocol stack 245 in case the EC node becomes a DC node for a new BPD subtree 150 and needs to interface with an MPD node 120 of the main network 110.

An MPD node 120 of the main network 110 stores and executes the conventional network protocol stack 245 to connect and communicate with other MPD nodes 120 of the main network 110 and possibly the DC node 160A of the BPD subtree 150. In these embodiments, an MPD node 120 of the main network 110 does not include the custom network protocol stack 250. Each MPD node 120 can include similar hardware components depicted for a BPD node 160 in FIG. 2, such as the computing device 210 coupled to the transceiver 280 and the oscillator 290.

In some embodiments, the custom network protocol stack 250 comprises a layer 2 protocol stack of the Open Systems Interconnection (OSI) model and the routing table 261 comprises a layer 2 routing table. In other embodiments, the custom network protocol stack 250 comprises a layer 3 protocol stack of the OSI model. Advantageously, implementing the custom network protocol stack 250 as a layer 2 protocol stack allows the custom network protocol to be agnostic to the conventional network protocol of the main network 110. In this regard, implementing the custom network protocol as a layer 2 protocol allows the custom network protocol to operate and be compatible with any type of layer 2 or layer 3 conventional network protocol.

In some embodiments, the conventional network protocol stack 245 comprises a cellular protocol stack for providing a cellular protocol to connect and communicate with a cellular network. In these embodiments, the main network 110 comprises a cellular network that includes at least one main network component comprising a cellular tower or eNodeB. The DC node 160A includes a cellular modem (not shown) for connecting with the cellular tower and/or eNodeB within the cellular network. In this manner, the DC node 160A can communicate with the cellular network (main network 110) as well as the BPD subtree 150.

Managing a BPD Subtree

In operation, the DC node 160A manages the BPD subtree 150 in accordance with the custom network protocol and custom subtree parameters 251. In particular, the DC node 160A ensures that the BPD subtree 150 complies with the maximum number of nodes for a subtree, the maximum number of node hops for a subtree, and the single parent requirement specified in the custom subtree parameters 251. In addition, the DC node 160A performs various functions as specified by the custom network protocol, such as a discovery process/function, a message routing process/function, and the like. The DC node 160A can generate and maintain a routing table 261 in the database 260 to assist in the managing of the BPD subtree 150 and the performance of the various functions.

Figure 3:
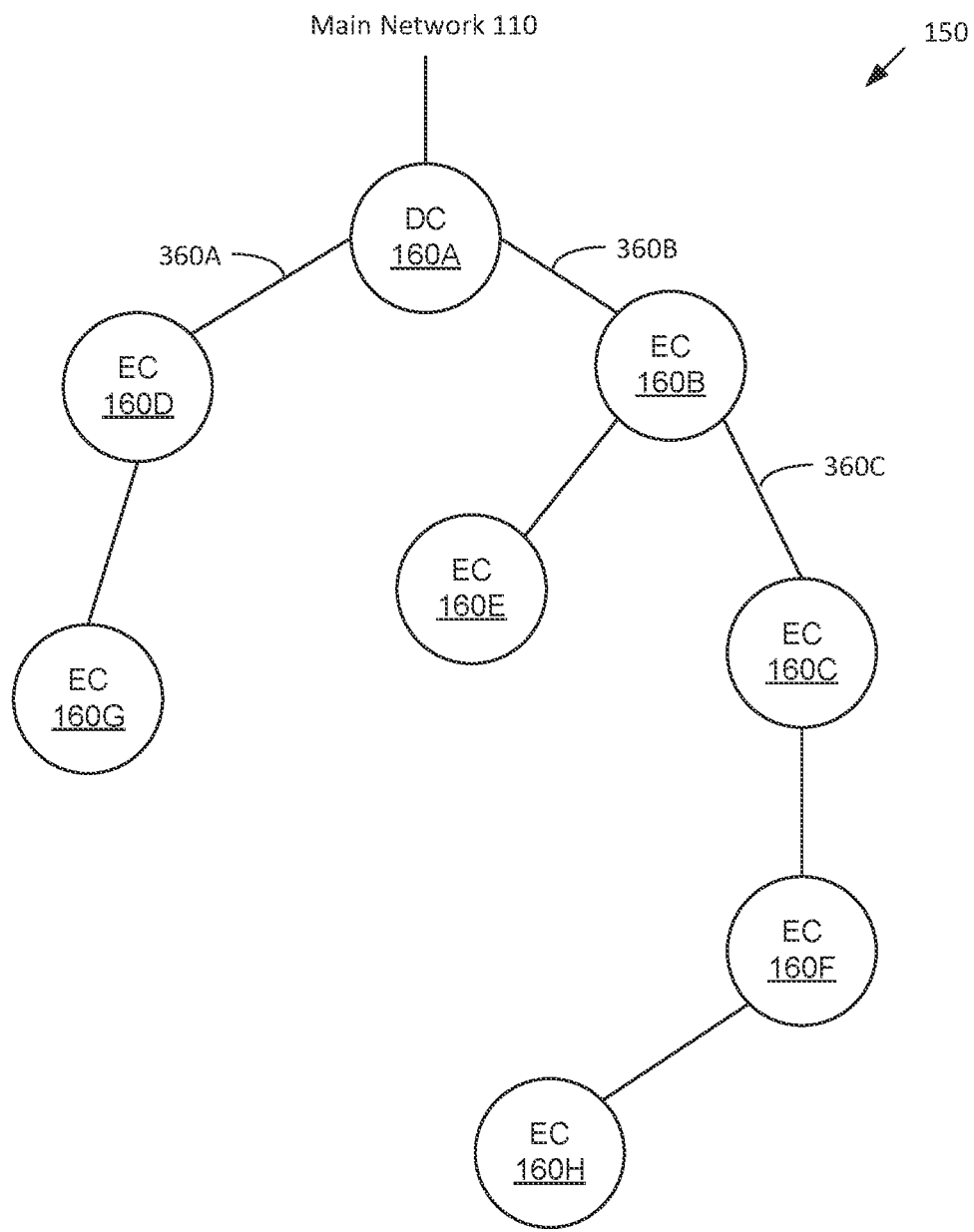
FIG. 3 illustrates a BPD subtree configured to operate within the network system of FIG. 1, according to various embodiments.

FIG. 3 illustrates a BPD subtree 150 configured to operate within the network system 100 of FIG. 1, according to various embodiments. As shown, the BPD subtree 150 includes a plurality of BPD nodes 160 (such as 160A, 160B, 160C). The BPD nodes 160 are configured to communicate directly with one or more adjacent nodes via bi-directional communication links 360 (such as 360A, 360B, 360C) that operate in accordance with the custom network protocol. The communication links 360 can be wired or wireless links. The BPD subtree 150 includes only a single root node (DC node 160A) and one or more EC nodes (such as 160B, 160C, 160D). In other embodiments, multiple DC BPD nodes can be connected to a MPD node.

The DC node 160A manages the BPD subtree 150 using a routing table 261. FIG. 4 is a conceptual diagram of a routing table 261 generated for the BPD subtree 150 of FIG. 3, according to various embodiments. The routing table 261 can be stored to the database 260 of the DC node 160A. The routing table 261 includes a plurality of entries 401 (such as 401A, 401B, 401C, etc.), each entry 401 corresponding to and representing a particular EC node (such as 160B, 160C, 160D) in the BPD subtree 150. Each entry 401 can include different data fields for a row number 405, a MAC address 410, a parent MAC address 415, and a timestamp 420.

The row number 405 of a particular entry 401 indicates the number of the row within the routing table 261 that includes the particular entry 401. The row number 405 can be used by the DC node 160A to determine the total number of EC nodes currently in the subtree 150. The MAC address 410 in a particular entry 401 specifies the MAC address of the EC node that is represented by the particular entry 401. The parent MAC address 415 in a particular entry 401 specifies the MAC address of the parent node of the EC node that is represented by the particular entry 401. The timestamp 420 in a particular entry 401 specifies a time that the information in the particular entry 401 was last validated/verified through an affiliation process.

For illustrative purposes, the MAC addresses in the routing table 261 of FIG. 4 are represented as letters, such as "A," "B," "C," etc. In addition, a reference to a particular node herein, such as EC node 160C, can indicate a reference to the MAC address of the particular node. The MAC addresses of the various nodes can be implemented in the various embodiments described herein. In other embodiments, however, any other type of network identifier or network address other than a MAC address can be is used to uniquely identify the nodes across a network.

In the example of FIG. 4, the DC node 160A generates and maintains the routing table 261 for the BPD subtree 150 of FIG. 3. As shown, the total number of rows of the routing table 261 equals 7, which also indicates the total number of EC nodes currently in the BPD subtree 150. The first entry 401A of the routing table 261 represents a first EC node 160B having a MAC address "B" 410 and a parent MAC address "A" 415 (corresponding to the DC node 160A). The second entry 401B of the routing table 261 represents a second EC node 160C having a MAC address "C" 410 and a parent MAC address "B" 415 (corresponding to the EC node 160B). The third entry 401C of the routing table 261 represents a third EC node 160D having a MAC address "D" 410 and a parent MAC address "A" 415 (corresponding to the DC node 160A). The fourth entry 401D of the routing table 261 represents a fourth EC node 160E having a MAC address "E" 410 and a parent MAC address "B" 415 (corresponding to the EC node 160B), and so forth. The seventh entry 401G of the routing table 261 represents a seventh EC node 160H having a MAC address "H" 410 and a parent MAC address "F" 415 (corresponding to the EC node 160F).

Adding a Node to a BPD Subtree

In operation, the DC node 160A generates and stores an entry 401 to the routing table 261 for an EC node when the EC node is added to the BPD subtree 150. For example, the DC node 160A generated and stored the seventh entry 401G of the routing table 261 when the seventh EC node 160H was added to the BPD subtree 150. In some embodiments, the custom network protocol defines a node adding process/function performed between the DC node 160A and one or more EC nodes to add a new EC node to the BPD subtree 150. As discussed above, since the custom network protocol only permits smaller and simpler BPD subtrees relative to conventional network protocols, the custom network protocol can define less complex functions for execution by the BPD nodes 160, such as the node adding process/function, relative to conventional network protocols. The simpler node adding process defined by the custom network protocol allows the BPD nodes 160 to expend less energy/battery power when executing the simpler node adding process, as compared to executing the more complex node adding process defined by a conventional network protocol.

To add a new BPD node to the subtree 150, a discovery process defined by the custom network protocol is performed by the new BPD node (referred to as the discovering node) and one or more current BPD nodes 160 of the subtree 150. The discovery process is performed to connect/link the discovering node with a single parent node in the subtree 150 that then allows the discovering node to transmit and receive messages from other nodes in the network system 100. The discovery process includes an affiliation process that is also defined by the custom network protocol. The affiliation process can be performed between the discovering node and the root DC node 160A to affiliate the discovering node with the root DC node 160A.

During the discovery process, the discovering node attempts to attach/connect to a current BPD node 160 of the subtree 150. In this regard, discovering node transmits discovery request messages during a discovery window. For example, due to the limited power of the BPD nodes, the discovery windows can be configured to occur only once or twice a day. Each discovery request message specifies the MAC address of the discovering node and a response window for a current BPD node 160 that receives the discovery request message to respond back to the discovering node. During a discovery window, each current BPD node 160 of the subtree 150 will "listen" for discovery request messages, for example, for a few seconds during the discovery window.

A current BPD node 160 that "hears" (successfully receives) a discovery request message from the discovering node comprises a potential parent node of the discovering node. Each potential parent node responds to the discovering node with a response message during the response window. A response message specifies a MAC address of the potential parent node, a number of node hops away the potential parent node is from the DC node 160A, and/or other information associated with the potential parent node. The discovering node receives a response message during the response window from each of one or more potential parent nodes. In response, the discovering node initiates a time synching procedure with each of the one or more potential parent nodes to link/synch with each of the one or more potential parent nodes.

As defined by the custom network protocol, each BPD node 160 in the subtree 150 can be attached to only a single parent node in the subtree 150 and cannot have multiple parent nodes. The single parent requirement is enforced by each BPD node that executes the custom network protocol. As such, if the discovering node is linked/synched with multiple potential parent nodes, the discovering node selects only a single potential parent node from among the multiple potential parent nodes for which to attach as a child node. The potential parent node that is selected by the discovering node is referred to as the selected parent node. If there is only one potential parent node, the selected parent node comprises the one potential parent node.

After the discovering node determines the selected parent node, an affiliation process is performed between the discovering node and the DC node 160A. The affiliation process is defined by the custom network protocol, and ensures that the size and complexity of the subtree 150 complies with the custom subtree parameters 251 defined by the custom network protocol. In particular, during the affiliation process, the DC node 160A verifies that adding the discovering node to the subtree 150 does not exceed/violate the maximum number of nodes permitted for a subtree 150 and also does not exceed/violate the maximum number of node hops permitted for a subtree 150, as specified by the custom subtree parameters 251. In some embodiments, that each EC node in the BPD subtree 150 ensures that the maximum number of node hops permitted for a subtree 150 is not exceeded, and the DC node 160A verifies (double checks) that the maximum number of node hops permitted for a subtree 150 is not exceeded. Therefore, the discovering node must successfully complete the affiliation process with the DC node 160A to become attached to the selected parent node and join the subtree 150.

The discovering node initiates the affiliation process by sending an affiliation request/message to the DC node 160A. The affiliation request/message specifies a MAC address of the discovering node and a MAC address of the selected parent node. The affiliation request is routed upstream through zero or more EC nodes to the DC node 160A. For example, if the discovering node comprises EC node 160H, EC node 160H sends the affiliation request to selected parent EC node 160F, which sends the affiliation request to parent EC node 160C, which sends the affiliation request to parent EC node 160B, which sends the affiliation request to parent DC node 160A. Upstream message routing is discussed below in relation to FIGS. 7-8.

The DC node 160A receives the affiliation request and determines whether to allow the discovering node to attach to the selected parent node and join the subtree 150 based on the information in the affiliation request, the custom subtree parameters 251, and the routing table 261. In particular, the DC node 160A permits the discovering node to join the subtree 150 if doing so would not violate/exceed the maximum number of nodes permitted for a BPD subtree 150 and also would not violate/exceed the maximum number of node hops permitted for a BPD subtree 150.

The DC node 160A determines if adding the discovering node would exceed the maximum number of nodes permitted in the BPD subtree 150. To do so, the DC node 160A can determine the current number of BPD nodes in the BPD subtree 150 by determining the total number of rows in the routing table 261. For example, the DC node 160A can determine the row number 405 specified in the last row entry 401 of the routing table 261, which indicates the current number of BPD nodes in the BPD subtree 150. In some embodiments, the current number of BPD nodes in the BPD subtree 150 does not include the DC node 160A. In these embodiments, the row number 405 specified in the last row entry 401 of the routing table 261 indicates the current number of BPD nodes in the BPD subtree 150. In other embodiments, the current number of BPD nodes in the BPD subtree 150 includes the DC node 160A. In these embodiments, the row number 405 specified in the last row entry 401 of the routing table 261 can be incremented by one to determine the current number of BPD nodes in the BPD subtree 150.

The DC node 160A can then determine the maximum number of nodes permitted in the BPD subtree 150 as specified in the custom subtree parameters 251. If adding the discovering node to the subtree 150 would cause the total number of nodes in the subtree 150 to exceed the maximum number of nodes permitted in the BPD subtree 150, the DC node 160A determines that the discovering node is not permitted to join the subtree 150. If adding the discovering node to the subtree 150 would not exceed the maximum number of nodes permitted in the BPD subtree 150, the DC node 160A determines that adding the discovering node would not violate/exceed the permitted maximum number of nodes. In other words, if adding the discovering node to the subtree 150 would cause the total number of nodes in the subtree 150 to be less than or equal to the maximum number of nodes permitted in the BPD subtree 150, the DC node 160A determines that adding the discovering node would not violate/exceed the permitted maximum number of nodes. For example, if the maximum number of nodes permitted for a subtree 150 equals 10, and adding the discovering node would create a subtree 150 with a total of 7 nodes, the DC node 160A determines that adding the discovering node would not violate/exceed the permitted maximum number of nodes (the resulting total number of nodes is less than or equal to the permitted maximum number of nodes).

The DC node 160A also determines if adding the discovering node to the subtree 150 by attaching the discovering node to the selected parent node would exceed the maximum number of node hops permitted in the subtree 150. To do so, the DC node 160A can determine the number of node hops associated with the selected parent node by analyzing the routing table 261. As discussed above, the affiliation request contains the MAC address of the selected parent node. Using the MAC address of the selected parent node, the DC node 160A can determine the number of node hops the selected parent node is from the DC node 160A. For example, if the selected parent node is EC node 160F, the DC node 160A determines that entry 401E of the routing table 261 represents EC node 160F, which indicates that EC node 160C is the parent node of EC node 160F, which signifies one node hop. The DC node 160A then determines that entry 401B of the routing table 261 represents EC node 160C, which indicates that EC node 160B is the parent node of EC node 160C, which signifies a second node hop. The DC node 160A then determines that entry 401A of the routing table 261 represents EC node 160B, which indicates that DC node 160A is the parent node of EC node 160B, which signifies a third node hop. Therefore, the DC node 160A determines that the selected parent node is three node hops away from the DC node 160A. The DC node 160A also determines that attaching the discovering node (such as EC node 160H) to the selected parent node (EC node 160F) means that the discovering node would be four node hops away from the DC node 160A.

The DC node 160A can then determine the maximum number of node hops permitted in the BPD subtree 150 as specified in the custom subtree parameters 251. If attaching the discovering node to the selected parent node would exceed the maximum number of node hops permitted in the subtree 150, the DC node 160A determines that the discovering node is not permitted to join the subtree 150. If attaching the discovering node to the selected parent node would not exceed the maximum number of node hops permitted in the subtree 150, the DC node 160A determines that adding the discovering node would not violate/exceed the permitted maximum number of node hops. In other words, if attaching the discovering node to the selected parent node would cause the number of node hops from the discovering node to the DC node 160A to be less than or equal to the maximum number of node hops permitted in the BPD subtree 150, the DC node 160A determines that adding the discovering node would not violate/exceed the permitted maximum number of node hops. For example, if the maximum number of node hops permitted for a subtree 150 equals 5, the DC node 160A determines that adding the discovering node would not violate/exceed the permitted maximum number of node hops (the resulting number of node hops from the discovering node to the DC node 160A would be less than or equal to the permitted maximum number of node hops).

Note that the DC node 160A permits the discovering node to join the subtree 150 if doing so does not violate/exceed the permitted maximum number of nodes and also does not violate/exceed the permitted maximum number of node hops. In this manner, the DC node 160A enforces the maximum number of nodes and the number of node hops specified by the custom network protocol to ensure a smaller and less complex subtree 150 than permitted by conventional network protocols.

If the DC node 160A determines that the discovering node is permitted to join the subtree 150, the DC node 160A generates a new entry 401 for the discovering node in the routing table 261. The DC node 160A also uses the MAC address of the discovering node and the MAC address of the selected parent node specified in the affiliation request to fill in the data fields for the MAC address 410, and the parent MAC address 415, respectively. The DC node 160A then fills in the data field for the timestamp 420 based on the current time that the new entry 401 is generated for the discovering node.

After determining whether or not to allow the discovering node to attach to the selected parent node and join the subtree 150, the DC node 160A sends an affiliation response/message downstream to the selected parent node. The affiliation response specifies a specific node route/path to the selected parent node and whether or not the discovering node is permitted to join the subtree 150. Downstream message routing is discussed below in relation to FIG. 6.

The selected parent node then receives the affiliation response. If the affiliation response indicates that the discovering node is permitted to join the subtree 150, the selected parent node sends a connection message to the discovering node to connect to the selected parent node. In response, the discovering node connects/attaches to the selected parent node by sending an association message to the selected parent node to create a secure link with the selected parent node. The discovering node is then connected to the selected parent node and is part of the BPD subtree 150. If the affiliation response indicates that the discovering node is not permitted to join the subtree 150, the selected parent node sends a connection message to the discovering node to not connect to the selected parent node. In response, the discovering node does not connect to the selected parent node and starts the discovery process over again to attach to another current node of the current subtree 150 or another subtree 150, or to an MPD node of the main network 110. Note that each EC node in the subtree 150 depicted in FIG. 3 can be added to the subtree 150 using the above discovery process.

After being added to the subtree 150, each EC node is configured by the custom network protocol to periodically re-affiliate with the DC node 160A. For example, each EC node can be configured to re-affiliate with the DC node 160A every day, or every 2 days. Each EC node can re-affiliate with the DC node 160A by sending a re-affiliation message specifying the MAC address of the EC node to the DC node 160A. When the DC node 160A receives the re-affiliation message from a particular EC node, the DC node 160A updates the timestamp 420 in the entry 401 of the routing table 261 corresponding to the particular EC node. The updated timestamp 420 indicates a current time that the DC node 160A received the re-affiliation message from the particular EC node. In this manner, the integrity of the data in the routing table 261 is maintained and kept current. In some embodiments, if the DC node 160A does not receive a re-affiliation message within a predetermined time period from the last updated timestamp from a particular EC node, the DC node 160A determines that the particular EC node has lost connectivity with the subtree 150 and removes the entry 401 corresponding to the particular EC node from the routing table 261. For example, if the DC node 160A does not receive a re-affiliation message within e.g., 3 days from the last updated timestamp from a particular EC node, the DC node 160A removes the entry 401 corresponding to the particular EC node from the routing table 261.

Figure 5A:
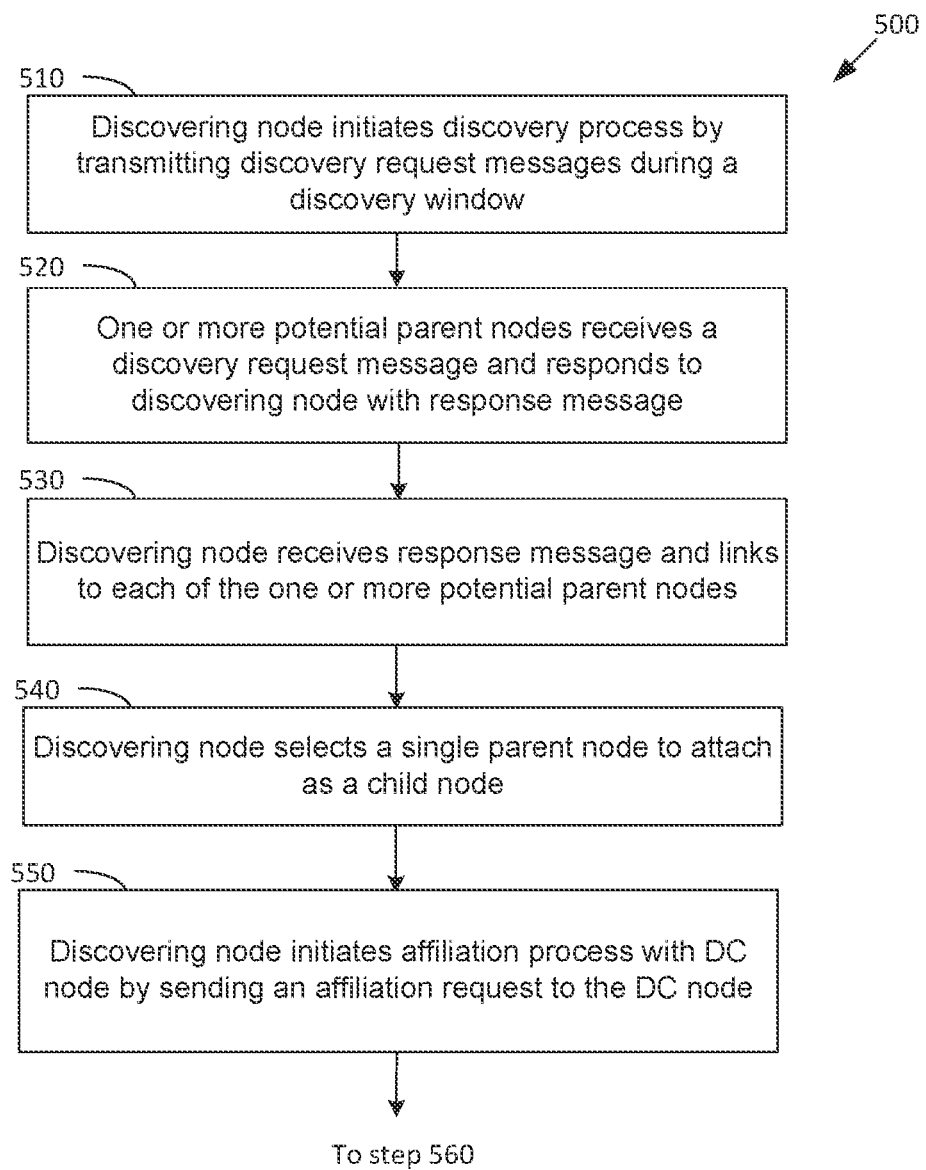
FIGS. 5A-5B set forth a flow diagram of method steps for adding a node to a BPD subtree, according to various embodiments.
Figure 5B:
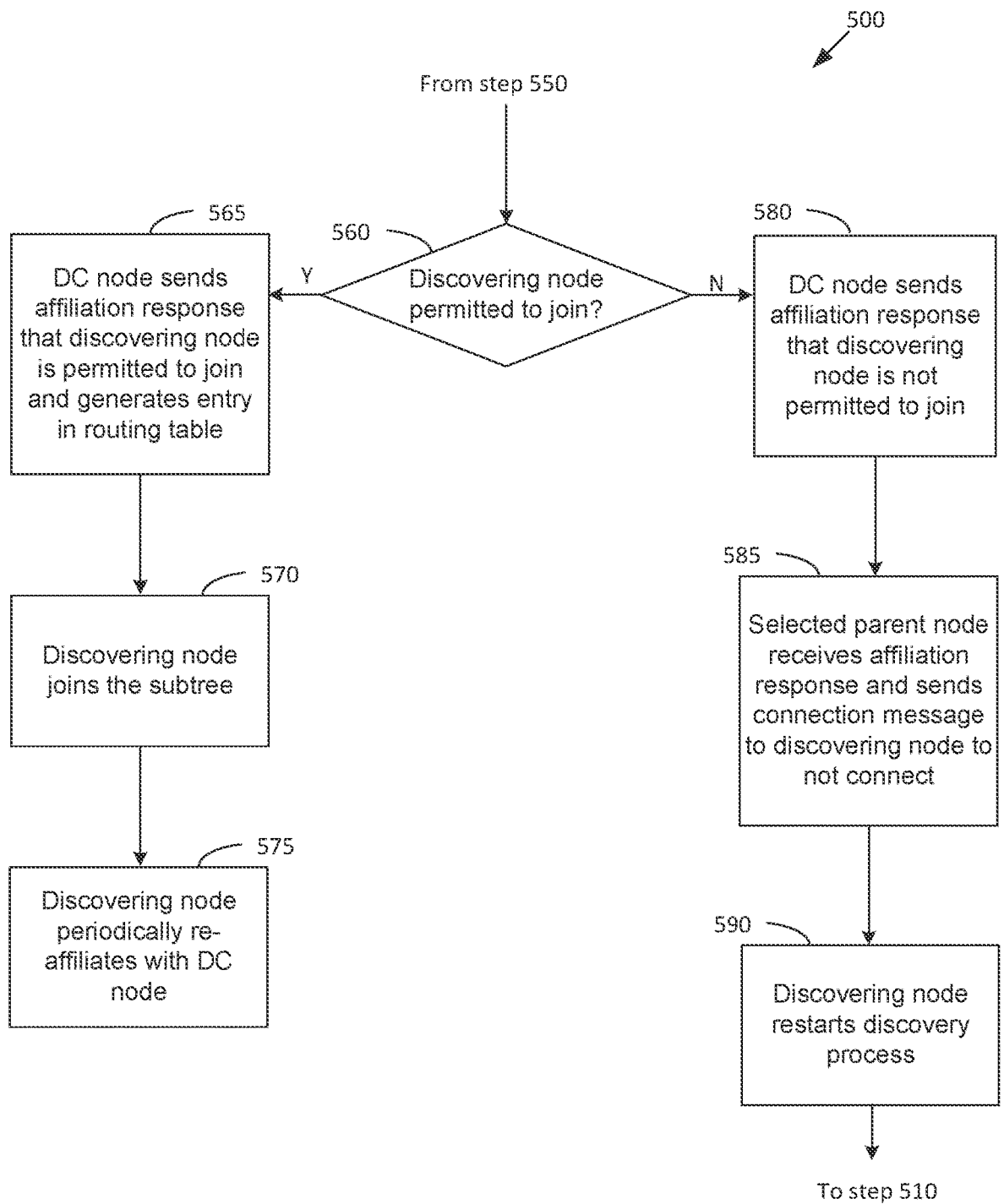

FIGS. 5A-5B set forth a flow diagram of method steps for adding a node to a BPD subtree, according to various embodiments. Although the method steps are described in conjunction with the systems of FIGS. 1-4, persons skilled in the art will understand that any system can be configured to perform the method steps in any order.

As shown, a method 500 begins at step 510, when a new BPD node (discovering node) to be added to the BPD subtree 150 initiates a discovery process with one or more current BPD nodes 160 of the subtree 150. The discovery process is defined by the custom network protocol to connect/link a node with a single parent node in the BPD subtree 150. The discovery process includes an affiliation process that is also defined by the custom network protocol. The discovering node initiates the discovery process (at step 510) by transmitting discovery request messages during a discovery window. Each discovery request message contains information that specifies a response window for responding back to the discovering node.

At step 520, during the discovery window, each current BPD node 160 of the subtree 150 "listens" for discovery request messages, wherein one or more current BPD nodes 160 (one or more potential parent nodes) successfully receives a discovery request message from the discovering node. In response, each potential parent node responds to the discovering node with a discovery response message during the response window specified in the discovery request message. A discovery response message specifies a MAC address of the potential parent node, a number of node hops between the potential parent node and the DC node 160A, a maximum number of node hops allowed, and/or other information associated with the potential parent node.

At step 530, the discovering node receives a discovery response message during the response window from each of the one or more potential parent nodes. In response, the discovering node links/synchs with each of the one or more potential parent nodes. At step 540, the discovering node selects only a single potential parent node from the one or more potential parent nodes to which to attach as a child node.

After the discovering node determines the selected parent node, an affiliation process is performed between the discovering node and the DC node 160A so that the DC node 160A can verify that adding the discovering node to the subtree 150 does not exceed/violate the maximum number of nodes permitted for a subtree 150 and also does not exceed/violate the maximum number of node hops permitted for a subtree 150, as specified by the custom subtree parameters 251. The affiliation process is performed in steps 550-590.

At step 550, the discovering node initiates the affiliation process by sending an affiliation request/message to the DC node 160A. The affiliation request/message specifies a MAC address of the discovering node and a MAC address of the selected parent node. The affiliation request is routed upstream through zero or more EC nodes to the DC node 160A using an upstream message routing process.

At step 560, the DC node 160A receives the affiliation request and, in response, determines whether or not to allow the discovering node to attach to the selected parent node and join the subtree 150 based on the information in the affiliation request, the custom subtree parameters 251, and the routing table 261. In particular, the DC node 160A makes a first determination that if adding the discovering node to the subtree 150 would produce a total number of nodes in the subtree 150 to be less than or equal to the maximum number of nodes permitted for a BPD subtree 150, as specified by the custom network protocol. The DC node 160A also makes a second determination that if attaching the discovering node to the selected parent node in the subtree 150 would produce a total number of node hops from the discovering node to the DC node 160A to be less than or equal to the maximum number of node hops permitted in a BPD subtree 150, as specified by the custom network protocol.

In step 560, if the DC node 160A determines that both the first determination and the second determination are true, the DC node 160A determines that adding the discovering node to the subtree 150 would not exceed the maximum number of nodes and would not exceed the maximum number of node hops permitted for a BPD subtree 150, as specified by the custom network protocol. Therefore, the DC node 160A determines that the discovering node is permitted to attach to the selected parent node and join the subtree 150, and the method 500 proceeds to step 565.

At step 565, the DC node 160A sends an affiliation response downstream to the selected parent node. The affiliation response specifies that the discovering node is permitted to join the subtree 150. The DC node 160A also generates and fills in a new entry 401 for the discovering node in the routing table 261. At step 570, the selected parent node then receives the affiliation response, and sends a connection message to the discovering node to connect to the selected parent node. In response, the discovering node connects/attaches to the selected parent node and joins the BPD subtree 150. At step 575, after being added to the subtree 150, the added node periodically re-affiliates with the DC node 160A by periodically sending a re-affiliation message to the DC node 160A. When the DC node 160A receives the re-affiliation message from the added node, the DC node 160A updates the timestamp 420 in the entry 401 of the routing table 261 corresponding to the added node.

However, in step 560, if the DC node 160A determines that either the first determination or the second determination are false, the DC node 160A determines that adding the discovering node to the subtree 150 would exceed either the maximum number of nodes or the maximum number of node hops permitted for a BPD subtree 150, as specified by the custom network protocol. Therefore, the DC node 160A determines that the discovering node is not permitted to attach to the selected parent node and join the subtree 150, and the method 500 proceeds to step 580.

At step 580, the DC node 160A sends an affiliation response downstream to the selected parent node. The affiliation response specifies that the discovering node is not permitted to join the subtree 150. At step 585, the selected parent node then receives the affiliation response, and sends a connection message to the discovering node to not connect to the selected parent node. In response, at step 590, the discovering node does not connect to the selected parent node and starts the discovery process over again at step 510 to attach to another node of the subtree 150 or another subtree 150.

Message Routing within a BPD Subtree

In some embodiments, the custom network protocol defines message routing (messaging) processes within the BPD subtree 150. As discussed above, since the custom network protocol only permits smaller and simpler BPD subtrees relative to conventional network protocols, the custom network protocol can define less complex messaging functions for execution by the BPD nodes 160 relative to conventional network protocols. The simpler messaging processes defined by the custom network protocol allows the BPD nodes 160 to expend less energy/battery power when executing the simpler messaging processes, as compared to executing the more complex messaging processes defined by a conventional network protocol. In message routing, any of the BPD nodes can operate as a source node, an intermediate node, or a destination node for the transmission of messages (data packets). A given source node generates a message and transmits the message to a destination node via any number of intermediate nodes.

The custom network protocol defines a downstream messaging process and an upstream messaging process. Downstream messaging routes messages in a direction from the DC node 160A towards the EC nodes of the BPD subtree 150. In contrast, upstream messaging routes messages in a direction from an EC node to the DC node 160A of the BPD subtree 150. The messaging processes can be used to route various messages described herein, such as data messages, and the like.

In downstream messaging, the DC node 160A receives an incoming message from the connecting MPD node 120A within the main network 110. The incoming message originates from an MPD node 120 within the main network 110 or from a device routed over the main network 110 and traverses one or more MPD nodes 120 within the main network 110 in accordance with the conventional network protocol to reach the DC node 160A. Therefore, the incoming message is routed through the main network 110 in accordance with the conventional network protocol. As such, the incoming message is encapsulated/packaged in accordance with the underlying conventional network protocol of the particular main network 110. The incoming message specifies the MAC address of the DC node 160A and the MAC address of the intended destination node that is to receive the message. The incoming message is routed to the DC node 160A using the MAC address of the DC node 160A and the conventional network protocol. The incoming message is then routed to the destination node within the subtree 150 using the MAC address of the destination node and the custom network protocol. Note that regardless of which type of conventional network protocol is used in the main network 110, once the incoming message is received at the DC node 160A, the custom network protocol is used to route the incoming message to the destination node within the subtree 150. As such, the downstream messaging function/process of the custom network protocol is agnostic to the type of conventional network protocol used in the main network 110.

In response to receiving the incoming message, the DC node 160A repackages the incoming message in accordance with the custom network protocol. In particular, the DC node 160A generates a repackaged incoming message (referred to herein as a downstream message) based on the information contained in the incoming message, the routing table 261, and the custom network protocol. The downstream message includes a downstream message indicator and specifies a node path/route from the DC node 160A to the destination node. The node path specifies a particular sequence of one or more EC nodes that connect the DC node 160A to the destination node, wherein the last EC node in the node path comprises the destination node that is to receive the downstream message. In particular, the node path specifies a particular sequence of MAC addresses corresponding to the one or more EC nodes that connect the DC node 160A to the destination node. In some embodiments, due to the single parent restriction, there is only a single node path from the DC node 160A to the destination node within the subtree 150. The downstream message indicator in the downstream message notifies each EC node to route the message downstream using the specified node path.

The DC node 160A determines the node path based on the MAC address of the destination node (specified in the incoming message) and the routing table 261. In particular, the DC node 160A identifies a particular entry 401 in the routing table 261 that corresponds to the destination node by analyzing the MAC address fields 410 in the routing table 261. The DC node 160A determines that a first entry 401 having a MAC address field 410 that matches the MAC address of the destination node is the entry 401 that corresponds to the destination node. The DC node 160A then determines the MAC address of the parent node (first intermediate node) for the destination node specified in the parent MAC address field 415 of the first entry 401. The DC node 160A then determines a second entry 401 corresponding to the first intermediate node, and determines the MAC address of the parent node (second intermediate node) in the parent MAC address field 415 in the second entry 401. The DC node 160A then determines a third entry 401 corresponding to the second intermediate node, and determines the MAC address of the parent node (third intermediate node) in the parent MAC address field 415 in the third entry 401, and so forth.

The DC node 160A performs the above process until reaching an entry 401 having a parent MAC address field 415 that specifies the DC node 160A itself. The DC node 160A then generates the node path by specifying a sequence of MAC addresses of nodes starting from the DC node 160A and ending with the destination node. For example, node path can specify in sequence the MAC addresses for: the DC node 160A, the third intermediate node, the second intermediate node, the first intermediate node, and the destination node. Therefore, the node path specifies a unique path/route within the subtree 150 from the DC node 160A to the destination node.

For example, in FIG. 3, assume that the destination node comprises EC node 160H. The DC node 160A determines that entry 401G of the routing table 261 represents EC node 160H (destination node), which indicates that EC node 160F (first intermediate node) is the parent node of EC node 160H. The DC node 160A then determines that entry 401E of the routing table 261 represents EC node 160F, which indicates that EC node 160C (second intermediate node) is the parent node of EC node 160F. The DC node 160A then determines that entry 401B of the routing table 261 represents EC node 160C, which indicates that EC node 160B (third intermediate node) is the parent node of EC node 160C. The DC node 160A then determines that entry 401A of the routing table 261 represents EC node 160B, which indicates that DC node 160A is the parent node of EC node 160B. The DC node 160A then generates the node path by specifying a sequence of MAC addresses of nodes starting from the DC node 160A and ending with the destination node EC node 160H. In this example, the node path can specify in sequence the MAC addresses for: the DC node 160A, EC node 160B, EC node 160C, EC node 160F, and EC node 160H (destination node).

The DC node 160A then transmits the downstream message to a particular child node, and the downstream message traverses one or more EC nodes within the subtree 150 in accordance with the custom network protocol to reach the destination node. Therefore, the downstream message is routed through the subtree 150 in accordance with the custom network protocol. In particular, the DC node 160A transmits the downstream message containing the node path to the first EC node specified in the node path using the MAC address of the first EC node. The DC node 160A can determine the MAC address of the first EC node by identifying the MAC address of EC node that immediately follows the MAC address of the DC node 160A in the node path. The first EC node then receives the downstream message and transmits the downstream message to the second EC node specified in the node path using the MAC address of the second EC node. The first EC node determines the MAC address of the second EC node by identifying the MAC address of EC node that immediately follows the MAC address of the first EC node in the node path. The second EC node then receives the downstream message and transmits the downstream message to the third EC node specified in the node path using the MAC address of the third EC node. The second EC node determines the MAC address of the third EC node by identifying the MAC address of EC node that immediately follows the MAC address of the second EC node in the node path, and so forth.

Note that the downstream message indicator in the downstream message notifies each EC node to route the message downstream using the node path. The downstream routing of the downstream message continues in this manner from the DC node 160A to each EC node in the node path in sequence until the downstream message reaches the destination node. When the last EC node in the node path receives the downstream message, the last EC node can determine that it is the destination node by matching the MAC address of last EC node to the last MAC address specified in the node path.

For example, in FIG. 3, assume that the destination node comprises EC node 160H and the downstream message includes a node path that specifies the sequence the MAC addresses: the DC node 160A, EC node 160B, EC node 160C, EC node 160F, and EC node 160H (destination node). The DC node 160A determines that EC node 160B immediately follows DC node 160A in the node path, and in response, transmits the downstream message to EC node 160B. EC node 160B receives the downstream message, determines that EC node 160C immediately follows EC node 160B in the node path, and in response, transmits the downstream message to EC node 160C. EC node 160C receives the downstream message, determines that EC node 160F immediately follows EC node 160C in the node path, and in response, transmits the downstream message to EC node 160F. EC node 160F receives the downstream message, determines that EC node 160H immediately follows EC node 160F in the node path, and in response, transmits the downstream message to EC node 160H. EC node 160H receives the downstream message and determines that it is the intended destination node for the downstream message.

Figure 6:
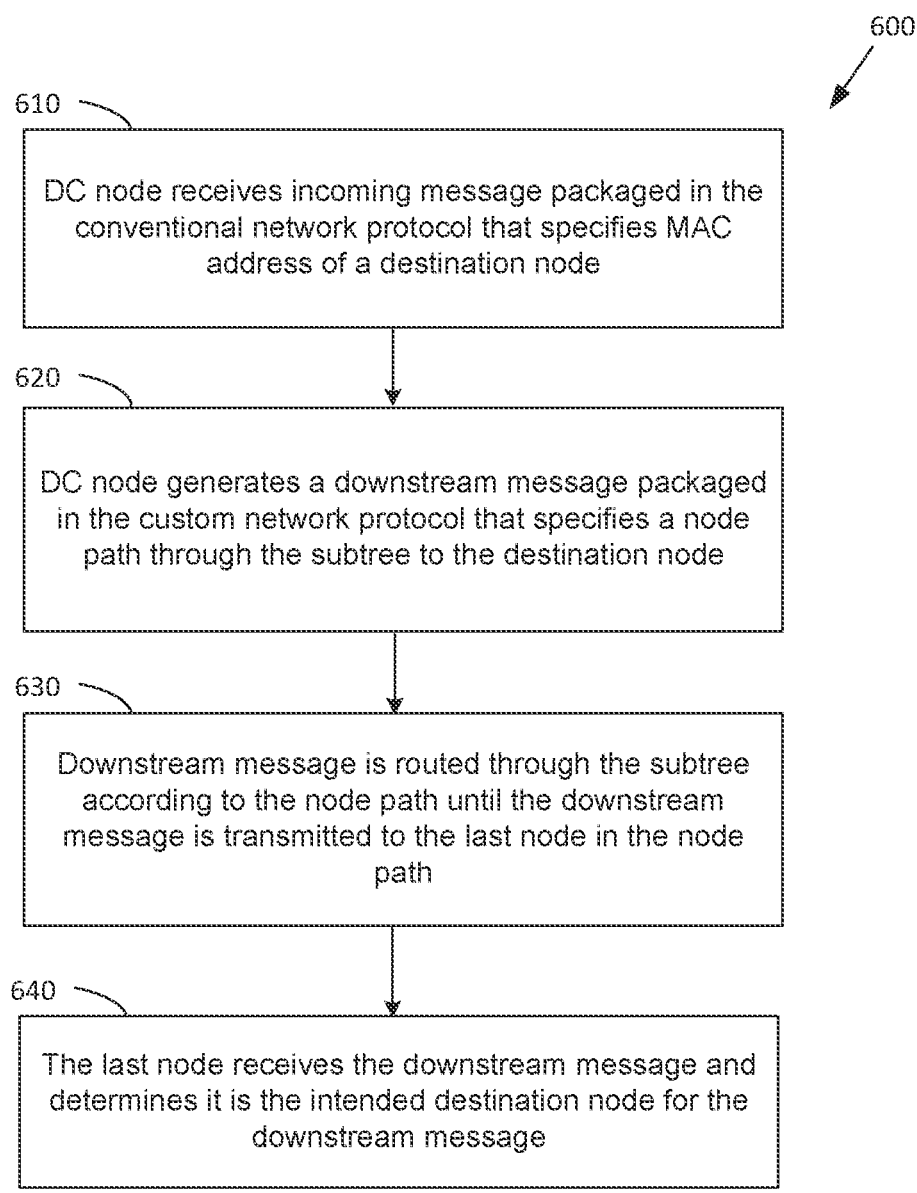
FIG. 6 sets forth a flow diagram of method steps for downstream message routing within a BPD subtree, according to various embodiments.

FIG. 6 sets forth a flow diagram of method steps for downstream message routing within a BPD subtree, according to various embodiments. Although the method steps are described in conjunction with the systems of FIGS. 1-4, persons skilled in the art will understand that any system can be configured to perform the method steps in any order.

As shown, a method 600 begins at step 610, when the DC node 160A receives an incoming message from the connecting MPD node 120A within the main network 110. The incoming message specifies the MAC address of the DC node 160A and the MAC address of the intended destination node that is to receive the message. The incoming message is encapsulated/packaged in accordance with the conventional network protocol of the main network 110. In response, at step 620, the DC node 160A generates a downstream message based on the information contained in the incoming message, the routing table 261, and the custom network protocol. The downstream message includes a downstream message indicator and specifies a node path/route through the subtree 150 to the destination node. The downstream message is repackaged in accordance with the custom network protocol of the subtree 150.

At step 630, the downstream message is routed through the subtree 150 according to the node path specified in the downstream message until the downstream message is transmitted to the last node in the node path. At step 640, the last node receives the downstream message and determines it is the intended destination node for the downstream message by determining that it is the last node specified in the node path. The method 600 then ends.

In upstream messaging, an EC node (source node) in the subtree 150 generates an upstream message intended for an upstream destination node in the subtree 150 or the main network 110. The upstream message includes an upstream message indicator and specifies the MAC address of the destination node. The upstream message is packaged in the custom network protocol. The upstream message indicator in the upstream message notifies each EC node to simply route the message to its single parent node unless the EC node is the destination node. In this regard, each EC node in the subtree 150 is configured by the custom network protocol to transmit a message including the upstream message indicator to its single parent node. This simplified upstream messaging process whereby each EC node transmits the upstream message to the parent node is enabled by the single parent restriction of the custom network protocol. In this manner, the upstream message is routed upstream through the subtree 150 from the source EC node through zero or more other EC nodes until it reaches a destination EC node or the DC node 160A.

The destination node can comprise an upstream node within the subtree 150. For example, in FIG. 3, assume the source node comprises EC node 160H and the destination node is EC node 160B. EC node 160H generates the upstream message that includes the upstream message indicator and specifies the destination node as EC node 160B (specifies the MAC address of EC node 160B). EC node 160H transmits the upstream message to parent EC node 160F. EC node 160F receives the upstream message and determines it is not the destination node and the message includes the upstream message indicator. In response, EC node 160F transmits the upstream message to parent EC node 160C. EC node 160C receives the upstream message and determines it is not the destination node and the message includes the upstream message indicator. In response, EC node 160C transmits the upstream message to parent EC node 160B. EC node 160C receives the upstream message and determines that it is the destination node.

Figure 7:
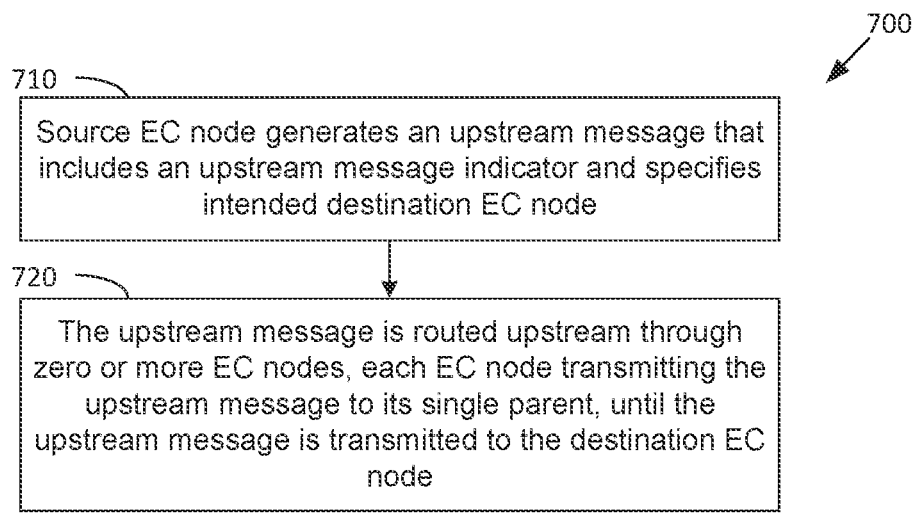
FIG. 7 sets forth a flow diagram of method steps for upstream message routing to a node within a BPD subtree, according to various embodiments.

FIG. 7 sets forth a flow diagram of method steps for upstream message routing to a node within a BPD subtree, according to various embodiments. Although the method steps are described in conjunction with the systems of FIGS. 1-4, persons skilled in the art will understand that any system can be configured to perform the method steps in any order.

As shown, a method 700 begins at step 710, when a source EC node generates an upstream message that includes an upstream message indicator and specifies the MAC address of a destination node within the subtree 150 to receive the upstream message. The upstream message is packaged in the custom network protocol. At step 720, the upstream message is routed upstream through zero or more EC nodes of the subtree 150, each EC node transmitting the upstream message to its single parent, until the upstream message is transmitted to the destination node. The method 700 then ends.

In other embodiments, the destination node can comprise an MPD node within the main network 110. In these embodiments, the upstream message is routed through the subtree 150 until it reaches the DC node 160A. When the DC node 160A receives upstream message (packaged in the custom network protocol) and determines it is not the destination node. In response, the DC node 160A repackages the upstream message in the conventional network protocol of the main network 110 to produce an outgoing message. The outgoing message specifies the MAC address of the destination MPD node in the main network 110. The DC node 160A then transmits the outgoing message to connecting MPD node 120A, which executes the conventional network protocol of the main network 110 to route the outgoing message to the destination MPD node. In other embodiments, the destination of the outgoing message can be any device or system to which the main network 110 can route a message, such as a main network access point (AP), a back-office system, and the like.

For example, in FIGS. 1 and 3, assume the source EC node comprises EC node 160B and the destination node is MPD node 120B within the main network 110. EC node 160B generates the upstream message packaged in the custom network protocol that includes the upstream message indicator and specifies the destination node as MPD node 120B (specifies the MAC address of MPD node 120B). EC node 160B transmits the upstream message to parent DC node 160A. DC node 160A receives the upstream message and determines it is not the destination node and the message includes the upstream message indicator. In response, DC node 160A repackages the upstream message in the conventional network protocol of the main network 110 to produce an outgoing message. The outgoing message specifies the MAC address of destination MPD node 120B. The DC node 160A then transmits the outgoing message to connecting MPD node 120A, which executes the conventional network protocol of the main network 110 to route the outgoing message to the destination MPD node 120B.

Figure 8:
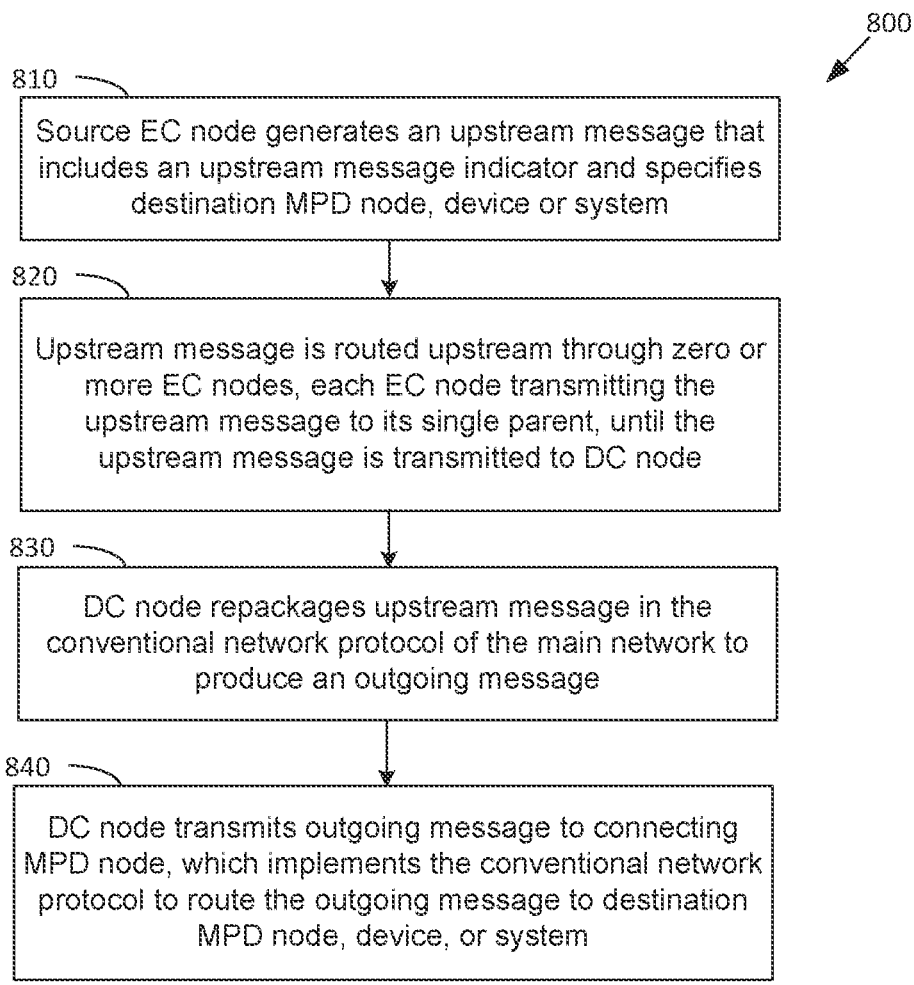
FIG. 8 sets forth a flow diagram of method steps for upstream message routing to an MPD node within a main network, according to various embodiments.

FIG. 8 sets forth a flow diagram of method steps for upstream message routing to an MPD node within a main network, according to various embodiments. Although the method steps are described in conjunction with the systems of FIGS. 1-4, persons skilled in the art will understand that any system can be configured to perform the method steps in any order.

As shown, a method 800 begins at step 810, when a source EC node generates an upstream message that includes an upstream message indicator and specifies the MAC address of an intended destination MPD node (or destination device or system) within the main network 110 to receive the upstream message. The upstream message is packaged in the custom network protocol. At step 820, the upstream message is routed upstream through zero or more EC nodes of the subtree 150, each EC node transmitting the upstream message to its single parent, until the upstream message is transmitted to the DC node 160A.

At step 830, DC node 160A receives the upstream message and determines it is not the destination node. In response, the DC node 160A repackages the upstream message in the conventional network protocol of the main network 110 to produce an outgoing message. The outgoing message specifies the MAC address of the destination MPD node in the main network 110. In other embodiments, the destination of the outgoing message can be any device or system to which the main network 110 can route a message, such as a main network access point (AP), a back-office system, and the like. At step 840, the DC node 160A transmits the outgoing message to connecting MPD node 120A, which executes the conventional network protocol of the main network 110 to route the outgoing message to the destination MPD node, or other destination device or system. The method 800 then ends.

Loop Management within a BPD Subtree

In a subtree 150 with multiple EC nodes, there is a potential for the inadvertent creation of node loops within the subtree 150. A node loop comprises a plurality of connected nodes that form a closed ring, whereby a first node in a node loop is both a descendant node and an ascendant node of a second node in the loop. In other words, the first node is a descendant of the second node, such as a child of the second node, a grandchild of the second node, a great-grandchild of the second node, and so forth. The first node is also an ascendant of the second node, such as a parent of the second node, a grandparent of the second node, a great-grandparent of the second node, and so forth. When a node loop is created, a message in the loop will route from the first node in the loop and return back to the first node. The message can enter the loop from an external source node outside of the loop, or the message can originate from a source node within the loop. A message in the loop may not reach the destination node, and may be continually routed through the loop. Node loops can be inadvertently created in a subtree 150 during migration of a set of nodes, or during regular operation of the subtree 150.

Figure 9:
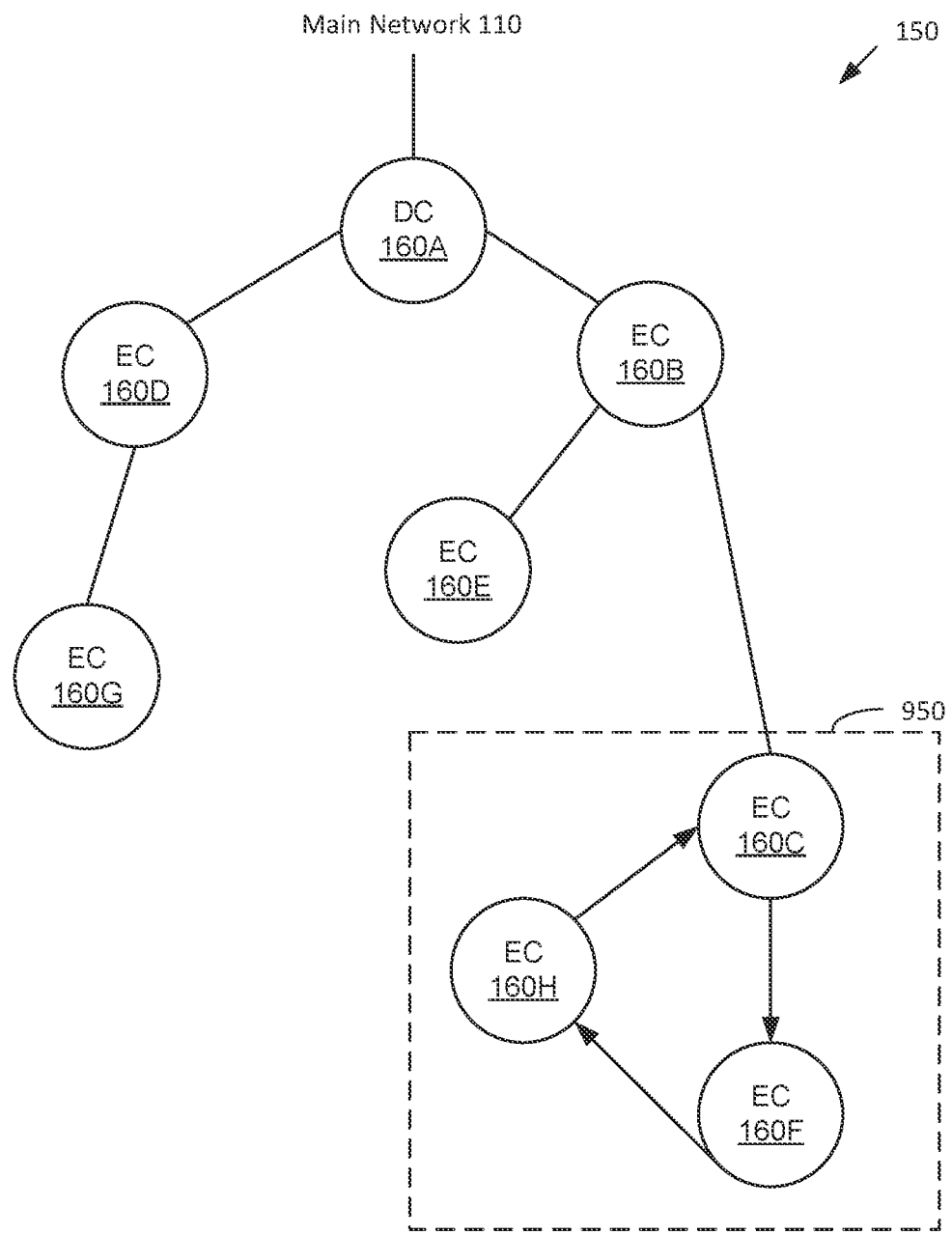
FIG. 9 illustrates a node loop created within a BPD subtree, according to various embodiments.

FIG. 9 illustrates a node loop 950 created within a BPD subtree 150, according to various embodiments. As shown, the node loop 950 includes a plurality of BPD nodes 160 including EC node 160C, EC node 160F, and EC node 160H, which form a closed ring. Each node in the node loop 950 is both a descendant and ascendant of every other node in the loop. For example, EC node 160C is both a descendant child of EC node 160H and an ascendant grandparent of EC node 160H. EC node 160C is also a descendant grandchild of EC node 160F and an ascendant parent of EC node 160F. As another example, EC node 160F is both a descendant child of EC node 160C and an ascendant grandparent of EC node 160C. EC node 160F is also a descendant grandchild of EC node 160H and an ascendant parent of EC node 160H. Therefore, a message that enters the loop or originates from a node in the loop will route from a first node in the loop and return back to the first node. For example, in FIG. 9, assume that source EC node 160F generates a message intended for DC node 160A. Source EC node 160F transmits the message to EC node 160H, which transmits the message to EC node 160C, which transmits the message back to EC node 160F. The message loop can continue in this manner without ever reaching the destination node.

Conventional network protocols define loop management functions that avoid and/or detect node loops. However, because conventional network protocols also permit relatively large and complex subtrees, whereby a child node can have multiple parents, the loop management functions defined by conventional network protocols are typically complex and require a significant amount of energy for a node to execute. While MPD nodes can execute the complex loop management functions of conventional network protocols, BPD nodes are at risk of depleting limited available battery power when executing the complex loop management functions.

To address these issues, the custom network protocol defines loop management functions/processes within the subtree 150 that are configured for the low power characteristics of the BPD nodes. First, the custom network protocol only permits smaller and simpler BPD subtrees relative to conventional network protocols. For example, custom network protocol permits each node in the subtree 150 to have only a single parent node, and does not permit multiple parent nodes. Therefore, the custom network protocol can define less complex loop management functions for execution by the BPD nodes 160 relative to conventional network protocols. The simpler loop management processes defined by the custom network protocol allows the BPD nodes 160 to expend less energy/battery power when executing the simpler loop management processes, as compared to executing the more complex loop management processes defined by a conventional network protocol.

In particular, since each EC node in the subtree can have only a single parent node under the custom network protocol, there is only a single node path from each EC node to the DC node 160A in the subtree 150. The single node path from an EC node to the DC node 160A is also referred to herein as an address list. In these embodiments, an address list is determined for each EC node during an address list process, and the custom network protocol leverages the address lists to define less complex loop management functions.

Figure 10:
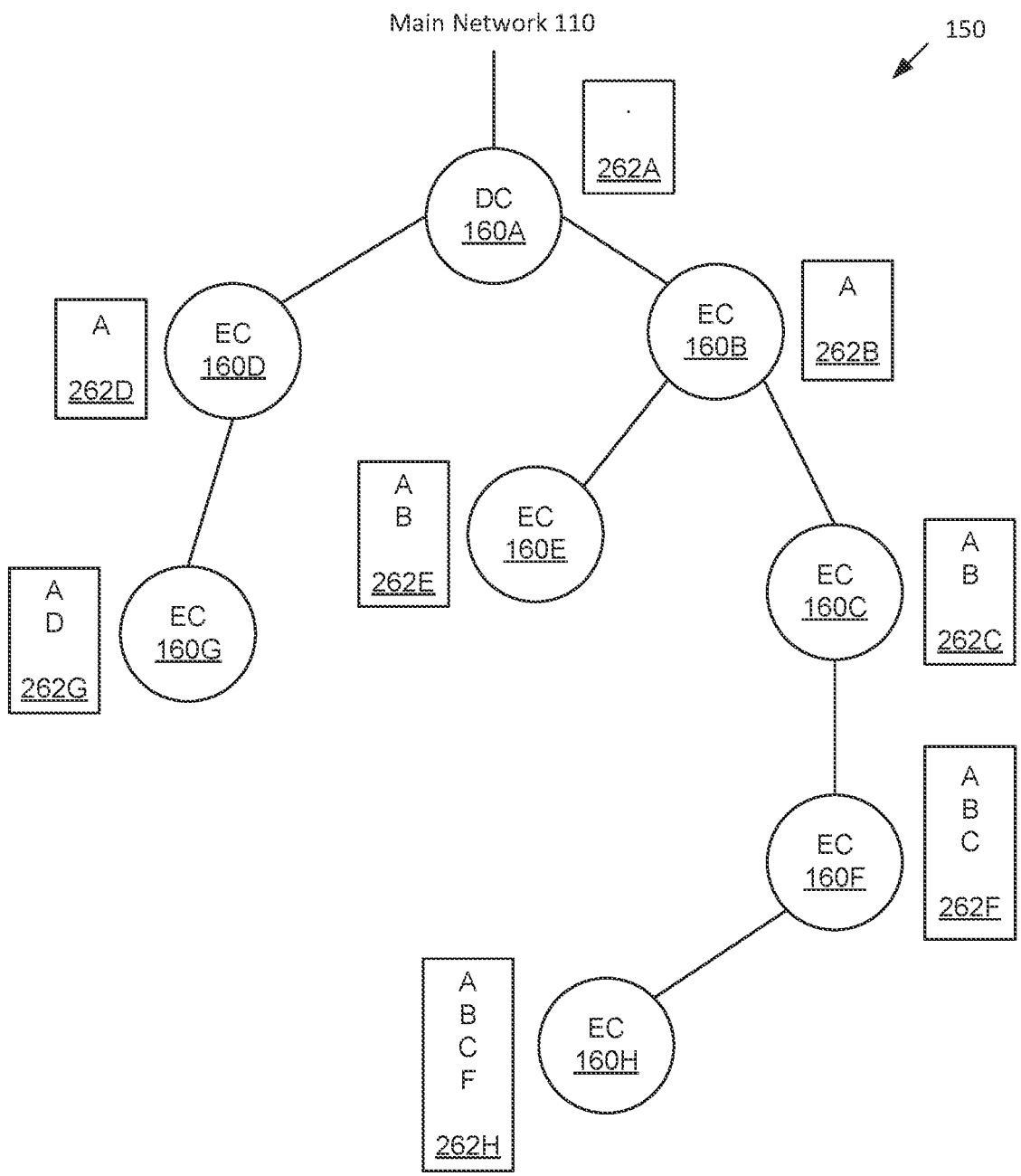
FIG. 10 illustrates a set of address lists associated with a BPD subtree, according to various embodiments.

FIG. 10 illustrates a set of address lists associated with a BPD subtree 150, according to various embodiments. Each BPD node in the subtree 150 generates and stores an associated address list 1010 (such as 262A, 262B, 262C) during an address list process. The address list 262A for DC node 160A comprises a null list. The address list associated with a particular EC node specifies a particular sequence of one or more BPD nodes that connect the DC node 160A to the parent node of the EC node. The first node in the address list comprises the DC node 160A and the last node in the address list comprises the parent node of the EC node. In some embodiments, due to the single parent restriction, there is a single node path from the DC node 160A to the parent node of the EC node within the subtree 150. In particular, the address list for a particular EC node specifies a sequence of MAC addresses corresponding to the one or more nodes that connect the DC node 160A to the parent node of the particular EC node. The address list for a particular EC node specifies a sequence of MAC addresses starting from the DC node 160A and ends with the parent node of the particular EC node. Therefore, the address list for a particular EC node specifies only ascendant nodes (parents, grandparents, etc.) of the particular EC node and does not include any descendant nodes (children, grandchildren, etc.) of the particular EC node. In some embodiments, the address list for a particular EC node does not include the MAC address of the particular EC node itself. In other embodiments, the address list for a particular EC node does include the MAC address of the particular EC node itself.

To generate the address lists, an address list process is performed whereby each BPD node in the subtree 150 is configured by the custom network protocol to periodically transmit (e.g., every 5 minutes) its address list to each child node. In response to receiving the parent address list from the parent node, each child node is triggered to generate its own address list using the parent address list of the parent node and transmit its address list to each child node. In particular, each child node receives the parent address list from the parent node, and in response, adds the MAC address of the parent node to the end of the parent address list to generate its own address list. Therefore, the address list of MAC addresses increases by one MAC address at each node hop away from the DC node 160A.

For example, in FIG. 10, the DC node 160A transmits its address list (null list) to each child node (EC node 160B and EC node 160D). EC node 160B receives the parent address list (null list) and adds the MAC address "A" of the parent node (DC node 160A) to the end of the parent address list to produce its own address list ("A"). EC node 160B then transmits its address list to each child node (EC node 160C and EC node 160E). EC node 160C receives the parent address list ("A") and adds the MAC address "B" of the parent node (EC node 160B) to the end of the parent address list to produce its own address list ("A," "B"). EC node 160C then transmits its address list to each child node (EC node 160F). EC node 160F receives the parent address list ("A," "B") and adds the MAC address "C" of the parent node (EC node 160C) to the end of the parent address list to produce its own address list ("A," "B," "C"). EC node 160F then transmits its address list to each child node (EC node 160H). EC node 160H receives the parent address list ("A," "B," "C") and adds the MAC address "F" of the parent node (EC node 160F) to the end of the parent address list to produce its own address list ("A," "B," "C," "F"). A similar process is performed at each node in the subtree 150 so that each node generates and stores an associated address list 262.

The custom network protocol utilizes the address lists 262 of the EC nodes in various loop management functions/processes that are executed by the EC nodes of the BPD subtree 150. The loop management processes include processes for loop avoidance during node migration and processes for loop detection during normal operations of the BPD subtree 150.

Loop Avoidance During Node Migration

In node migration, a sub-portion of the subtree 150 moves to different locations within the subtree 150 or to another subtree 150. In particular, a migrating group of two or more nodes changes position within a current subtree 150 or moves to another subtree 150. The migrating group of nodes includes a root node for the migrating group and one or more descendant nodes of the root node. When migrating, the root node of the migrating group moves from a previous parent node to a new parent node. In other words, the root node of the migrating group loses connection with a previous parent node and connects to a new parent node. The new parent node can be included in the previous subtree 150 or included in a new subtree 150. The descendant nodes of the root node can also migrate with the root node as a migrating group to new positions within the previous subtree 150 or a new subtree 150. In these embodiments, the node structure of the migrating group is retained when the migrating group moves from the previous parent node to the new parent node.

Node migration can be triggered unintentionally or intentionally. In unintentional node migration, the root node of the migrating group inadvertently loses connection with the parent node in the subtree 150 and performs a discovery process to search for a new parent node for which to attach. The lost connection can be caused by various factors, such as weak signal strength, hardware malfunctions, software errors, and the like. In intentional node migration, the root node of the migrating group intentionally loses connection with the parent node in the subtree 150 to make a connection with a new parent node. For example, each BPD node can be configured to periodically scan/search for a better connection to a new parent node than a current connection to a current parent node. If the BPD node finds a better connection to a new parent node, the EC node can intentionally lose connection with the current parent node to initiate the migration process.

The migration process is triggered by the root node of the migrating group after a connection to the parent node is lost (unintentionally or intentionally). In response to losing the connection to the parent node, the root node of the migrating node initiates a discovery process to search for and connect to a new parent node. In these embodiments, the custom network protocol defines a loop avoidance process/function that is performed by one or more BPD nodes during the migration and discovery processes to prevent a node loop from being created during the migration and discovery processes.

Figure 11:
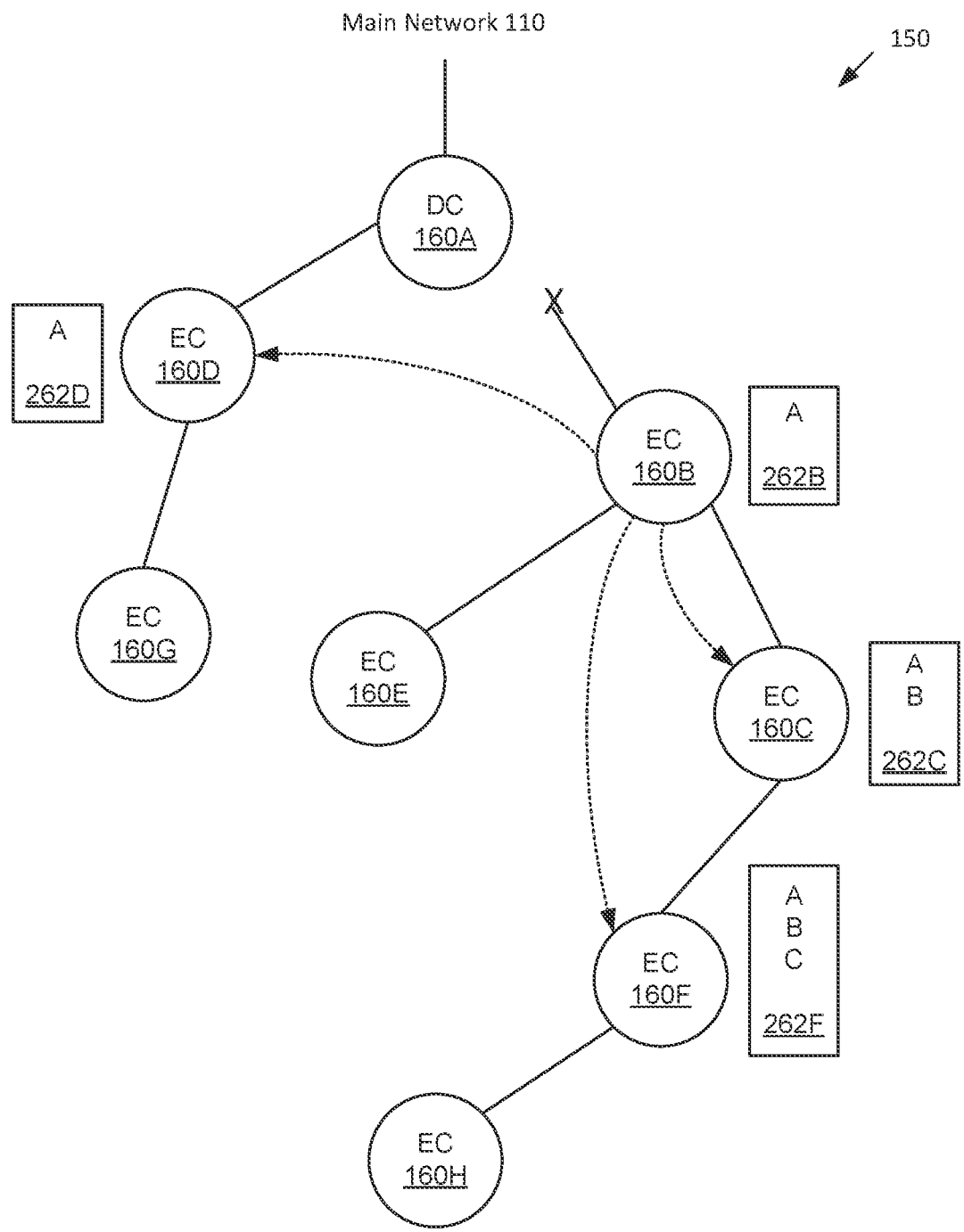
FIG. 11 illustrates a node migration process within a BPD subtree, according to various embodiments.

FIG. 11 illustrates a node migration process within a BPD subtree 150, according to various embodiments. As shown, EC node 160B loses connection with parent DC node 160A, which triggers the EC node 160B (the discovering node) to initiate a discovery process. During the discovery process, the discovering node attempts to search for and connect to a BPD node 160 of the current subtree 150 or another subtree 150. The discovery process is discussed above in relation to FIGS. 5A-B and is not discussed in detail here.

To initiate the discovery process, the discovering node (EC node 160B) transmits discovery request messages during a discovery window, each discovery request message including the MAC address of the discovering node. In the example of FIG. 11, three nodes successfully receive a discovery request message from the discovering node, as indicated by the dashed arrow lines. The three nodes that successfully receive the discovery request message comprise EC node 160C, EC node 160D, and EC node 160F. Each of the three nodes comprises a potential parent node of the discovering node (EC node 160B). In response to receiving the discovery request message, each potential parent node of the discovering node then determines if a node loop would be created if the discovering node attaches to the potential parent node as a child node.

A potential parent node determines if a node loop would be created based on the MAC address of the discovering node (as specified in the discovery request message) and the address list 262 associated with the potential parent node. If the potential parent node determines that the MAC address of the discovering node is included in the address list 262 for the potential parent node, then the potential parent node determines that a node loop would be created if the discovering node attaches to the potential parent node as a child node (determines that the discovering node and the potential parent node are included in a potential node loop). Note that the address list for a potential parent node includes only ascendant nodes (parents, grandparents, etc.) of the potential parent node and does not include any descendant nodes (children, grandchildren, etc.) of the potential parent node. If the discovering node is included in the address list for the potential parent node, the address list indicates that the discovering node comprises an ascendant node of the potential parent node. However, if the discovering node attaches to the potential parent node as a child node, then the discovering node would also become a descendant node of the potential parent node. If the discovering node becomes both an ascendant node and a descendant node of the potential parent node, a node loop would be created if the discovering node attaches to the potential parent node as a child node.

Therefore, if the MAC address of the discovering node is included in the address list 262 for the potential parent node, then the potential parent node determines that a node loop would be created if the discovering node attaches to the potential parent node as a child node (determines that the discovering node and the potential parent node are included in a potential node loop). Note that a potential parent node that receives a discovery request message from a discovering node is typically configured to respond to the discovering node with a response message. However, in response to determining that a node loop would be created, the potential parent node does not respond to the discovering node with a response message. In this manner, a node loop is prevented from being created within the subtree 150.

However, if a potential parent node determines that the MAC address of the discovering node is not included in the address list 262 for the potential parent node, then the potential parent node determines that a node loop would not be created if the discovering node attaches to the potential parent node as a child node (determines that the discovering node and the potential parent node are not included in a potential node loop). Since the address list does not include the discovering node, the address list indicates that the discovering node is not an ascendant node of the potential parent node. Therefore, if the discovering node attaches to the potential parent node as a child node, then the discovering node would only become a descendant node of the potential parent node, which does not create a node loop. In response to the determination, the potential parent node responds to the discovering node with a response message. Note that the potential parent node responds to the discovering node with a response message only after the potential parent node has analyzed its address list and made a determination that no loop would be created based on the analysis of the address list.

For example, in FIG. 11, potential parent EC node 160C receives the discovery request message from the discovering node (EC node 160B) and, in response, determines that the MAC address of the discovering node ("B") is included in the address list 262C for EC node 160C. Therefore, EC node 160C determines that if the discovering node attaches to EC node 160C as a child node, a node loop would be created that includes the discovering node and the potential parent node. In response, EC node 160C does not respond to the discovering node with a response message, which prevents the node loop from being created. Similarly, potential parent EC node 160F receives the discovery request message from the discovering node (EC node 160B) and, in response, determines that the MAC address of the discovering node ("B") is included in the address list 262F for EC node 160F. Therefore, EC node 160F determines that if the discovering node attaches to EC node 160F as a child node, a loop would be created that includes the discovering node and the potential parent node. In response, EC node 160F also does not respond to the discovering node with a response message, which prevents the loop from being created. Lastly, potential parent EC node 160D receives the discovery request message from the discovering node (EC node 160B) and, in response, determines that the MAC address of the discovering node ("B") is not included in the address list 262D for EC node 160D. Therefore, EC node 160D determines that if the discovering node attaches to EC node 160D as a child node, a loop would not be created that includes the discovering node and the potential parent node. In response, EC node 160D responds to the discovering node with a response message.

After a potential parent node responds to the discovering node with a response message, the discovering node receives the response message and links with the potential parent node. The response message specifies a MAC address of the potential parent node, and a number of node hops away the potential parent node is from the DC node 160A. If the discovering node receives a response message from multiple potential parent nodes, the discovering node selects a single parent node. The discovering node then initiates an affiliation process between the discovering node and the DC node 160A of the subtree 150 based on the information included in the response message of the selected parent node. The affiliation process is discussed above in relation to FIGS. 5A-B and is not discussed in detail here.

An affiliation process is performed between the discovering node and the DC node 160A so that the DC node 160A can verify that attaching the discovering node to the selected parent node and adding the discovering node to the subtree 150 does not exceed/violate the maximum number of nodes permitted for a subtree 150 and also does not exceed/violate the maximum number of node hops permitted for a subtree 150, as specified by the custom subtree parameters 251. If the affiliation process is not successful (the DC node 160A does not permit the discovering node to attach to the selected parent node and join the subtree 150), the discovering node restarts the discovery process to search for another parent node.

If the affiliation process is successful (the DC node 160A permits the discovering node to attach to the selected parent node and join the subtree 150), the discovering node attaches to the selected parent node and joins the subtree 150. In addition, if the affiliation process is successful and the discovering node has joined the subtree 150, the DC node 160A triggers the address list process that causes the address lists of the EC nodes in the subtree 150 to be updated. The DC node 160A can do so by transmitting the address list 262A associated with the DC node 160A to each child node, which triggers each child node to update its address list and transmit the updated address list to each child node, and so forth, until each EC node in the subtree 150 has updated its address list. The address list process is described in relation to FIG. 10 and is not discussed in detail here.

Figure 12:
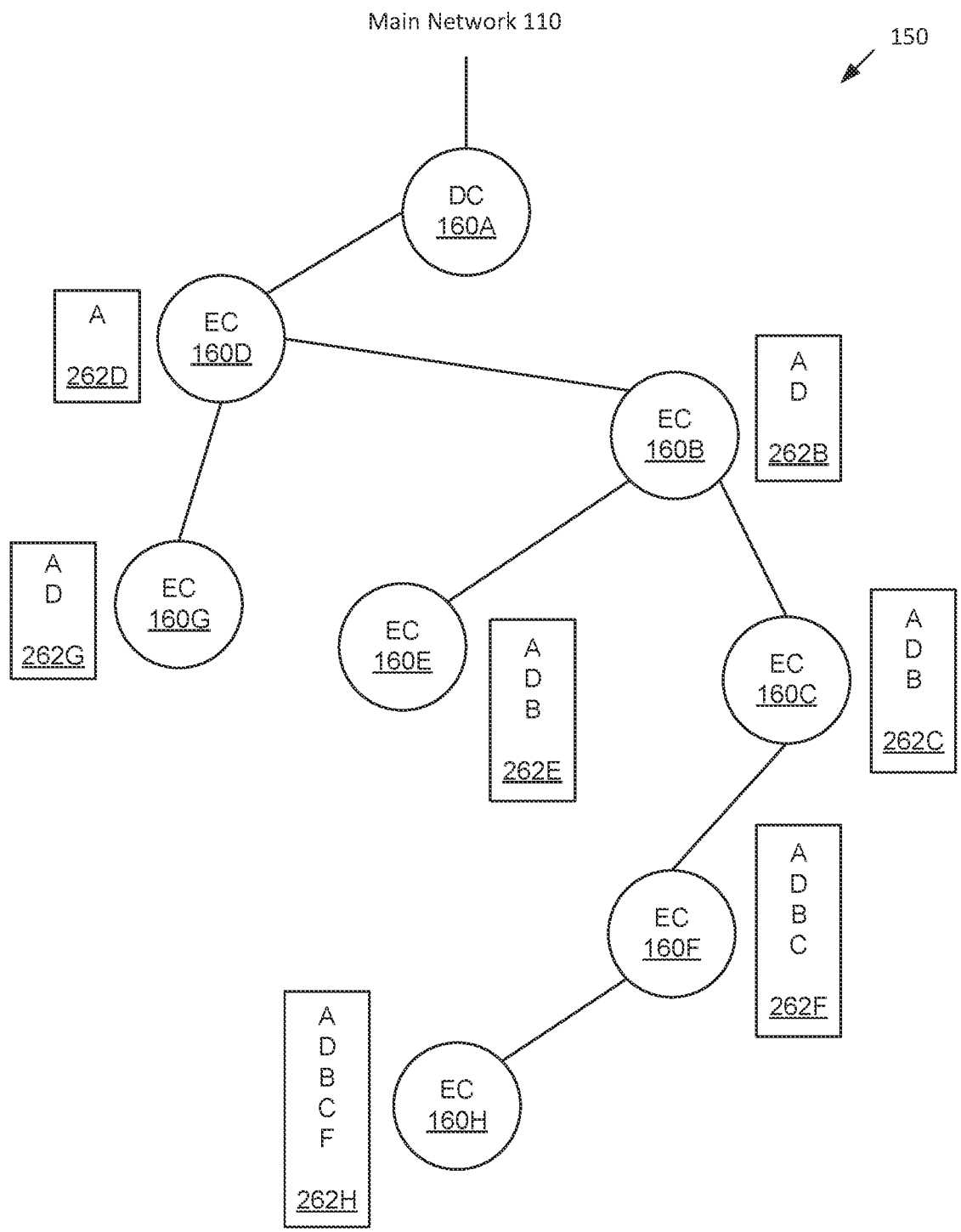
FIG. 12 illustrates a successful node migration within a BPD subtree, according to various embodiments.

FIG. 12 illustrates a successful node migration within a BPD subtree 150, according to various embodiments. As shown, the discovering node (EC node 160B), which is the root node of the migrating group, has successfully connected to new parent node EC 160D and joined the subtree 150. As a result, the DC node 160A has triggered the address list process that causes the address lists of the EC nodes in the subtree 150 to be updated to reflect the successful node migration and the new node structure of the subtree 150. For example, EC node 160B modifies its address list 262B from "A" to "A," "D" which indicates that EC node 160D is the new parent node of EC node 160B, which causes each of the descendant nodes of EC node 160B to modify the respective address list to include the new parent node of EC node 160B. For example, EC node 160F modifies it address list 262F from "A," "B," "C" to "A," "D," "B," "C" to include the new parent node of EC node 160B. In this manner, the address lists of the nodes in the migrating group can be updated to reflect the successful migration to the new parent node.

In addition, each EC node can be triggered to reperform the affiliation process with the DC node 160A when its address list is modified/updated to ensure the new node structure of the subtree 150 caused by the node migration complies with the maximum number of nodes permitted for a subtree 150 and the maximum number of node hops permitted for a subtree 150, as specified by the custom subtree parameters 251. In particular, each EC node in the subtree 150 can be triggered to independently reperform the affiliation process with the DC node 160A to ensure the new position of the EC node within the subtree 150 caused by the node migration complies with the maximum number of nodes permitted for a subtree 150 and the maximum number of node hops permitted for a subtree 150. For example, each EC node can be triggered to reperform the affiliation process in response to receiving the address list from the parent node, or in response to receiving a modified address list from the parent node.

If the EC node successfully performs the affiliation process with the DC node 160A, the EC node remains joined to the subtree 150. However, if the EC node does not successfully perform the affiliation process with the DC node 160A, the EC node disconnects with its parent node and performs a discovery process to search for a new parent node. For example, due to the node migration, EC node 160H is now one further hop from DC node 160A, which can cause the EC node 160H to fail the affiliation process with the DC node 160A if the EC node 160H now exceeds the maximum number of node hops permitted for a subtree 150. If so, the EC node 160H performs a discovery process to attach to a new parent node without exceeding the permitted maximum number of node hops, such as EC node 160G.

As discussed above, the migrating group of nodes includes a root node for the migrating group and one or more descendant nodes of the root node. For example, in FIG. 11, the migrating group includes the root node EC 160B and all descendant node of the root node, which includes EC node 160C, EC node 160E, EC node 160F, and EC node 160H. The migrating group and the subtree 150 in general has a particular node structure in terms of the parent-child relationships and node connections that exist within the migrating group and subtree 150. In some embodiments, the root node is configured to keep/maintain a connection with each child node for a predetermined period of time after losing connection with the parent node. In these embodiments, the root node is configured to not automatically lose connection with each child node immediately after losing connection with the parent node. In this manner, the node structure of the migrating group and the subtree 150 can be maintained as much of possible during migration to avoid a significant re-structuring of the subtree 150 which can be computationally expensive. In particular, if each descendant node of the root node loses connection with its parent node during migration, each descendant node must perform a discovery process to search for a new parent node, which is computationally expensive and expends the limited battery power of each descendant node. As shown in the example of FIG. 11, the node structure of the migrating group is kept intact when the root node EC 160B of the migrating group migrates to new parent node EC 160D.

However, if the root node of the migrating group does not connect to a new parent node within the predetermined period of time after losing connection with the previous parent node, the root node can abandon/lose connection with the descendant nodes. To do so, the root node transmits a reconnection message to each child node to connect with another parent node, which causes each child node to force a disconnection with the root node and transmit a reconnection message to each of its child nodes to connect with another parent node, which in turn causes those child nodes to force a disconnection with the parent node and transmit a reconnection message to each of its child nodes to connect with another parent node, and so forth. In this manner, each descendant node of the root node of the migrating group forces a disconnection with the respective parent node, which causes each descendant node to initiate a discovery process to search for a new parent node.

Figure 13:
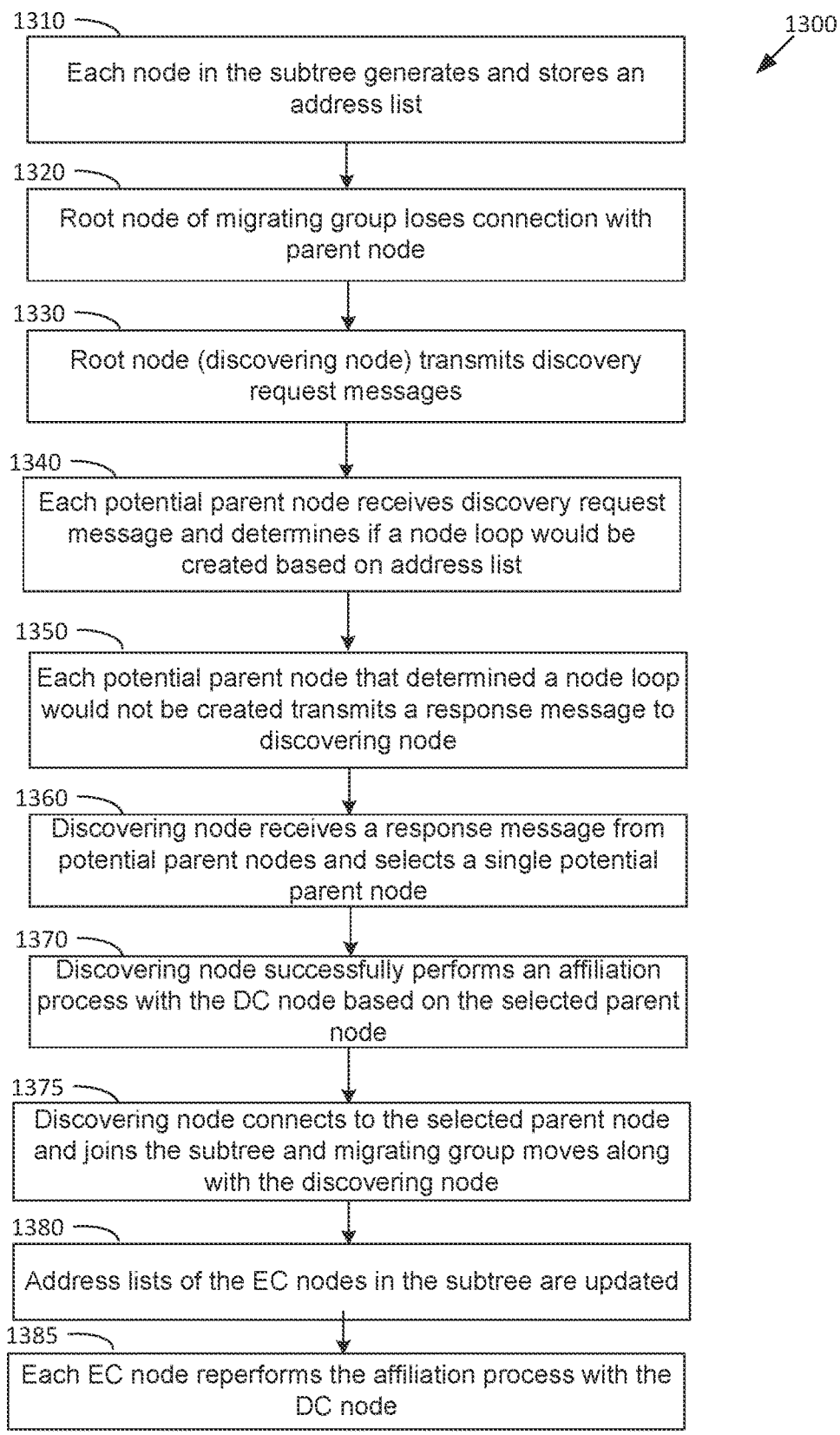
FIG. 13 sets forth a flow diagram of method steps for loop avoidance during node migration within a BPD subtree, according to various embodiments.

FIG. 13 sets forth a flow diagram of method steps for loop avoidance during node migration within a BPD subtree, according to various embodiments. Although the method steps are described in conjunction with the systems of FIGS. 1-4 and 9-12, persons skilled in the art will understand that any system can be configured to perform the method steps in any order.

As shown, a method 1300 begins at step 1310, when each BPD node in the subtree 150 generates and stores an address list 262 during an address list process. To do so, the DC node 160A transmits its address list 262 to each child node, which triggers each child node to generate its address list based on the parent address list and transmit the generated address list to each child node, and so forth. An address list associated with a particular EC node specifies a sequence of MAC address starting from the DC node 160A and ending with the parent node of the particular EC node. Therefore, the address list for a particular EC node specifies only ascendant nodes of the particular EC node and does not include any descendant nodes of the particular EC node.

At step 1320, a root node of a migrating group loses connection (unintentionally or intentionally) with its parent node included in the subtree 150. The migrating group includes the root node and one or more descendant nodes of the root node. In response to losing connection with the parent node, the root node maintains a connection with each child node for a predetermined time period to allow the root node to connect to a new parent node. In this manner, the node structure of the migrating group is kept intact for the predetermined time period. At step 1330, in response to losing the connection to the parent node, the root node of the migrating node (discovering node) initiates a discovery process by transmitting discovery request messages during a discovery window. Each discovery request message includes the MAC address of the discovering node.

At step 1340, one or more potential parent nodes in the current subtree 150 or another subtree successfully receives a discovery request message from the discovering node. In response, each potential parent node determines if a node loop would be created if the discovering node attaches as a child node based on the MAC address of the discovering node and the address list 262 for the potential parent node. In particular, if the potential parent node determines that the MAC address of the discovering node is included in the address list 262 for the potential parent node, then the potential parent node determines that a node loop would be created (determines that the discovering node and the potential parent node are included in a potential node loop). If a potential parent node determines that the MAC address of the discovering node is not included in the address list 262 for the potential parent node, then the potential parent node determines that a node loop would not be created (determines that the discovering node and the potential parent node are not included in a potential node loop).

At step 1350, each of the one or more potential parent nodes that determined that a node loop would not be created transmits a response message to the discovering node. Note that a potential parent node responds to the discovering node with a response message only after the potential parent node has analyzed its address list and made a determination that no loop would be created based on the analysis of the address list. Each of the one or more potential parent nodes that determined that a node loop would be created does not transmit a response message to the discovering node at step 1350.

At step 1360, the discovering node receives a response message from one or more potential parent nodes and links to each of the one or more potential parent nodes that transmitted the response message. If multiple potential parent nodes transmitted the response message, the discovering node selects a single potential parent node for which to attach as a child node. The response message of the selected parent node specifies a MAC address of the selected parent node, and a number of node hops away the selected parent node is from the DC node 160A.

At step 1370, the discovering node initiates and successfully performs an affiliation process with the DC node 160A based on the information included in the response message of the selected parent node. A successful affiliation process indicates that the DC node 160A permits the discovering node to attach to the selected parent node and join the subtree 150. At step 1375, the discovering node connects to the selected parent node and joins the subtree 150 to complete a successful node migration. Note that the entire migrating group moves along with the discovering node (root node of the migrating group) and the node structure of the migrating group is preserved/retained during the migration. In this manner, as the root node of the migrating group moves to a new position within the subtree 150, the entire migrating group also moves to corresponding new positions within the subtree 150.

At step 1380, the DC node 160A triggers the address list process that causes the address lists of the EC nodes in the subtree 150 to be updated based on the successful node migration of the discovering node and the new positions of the root node and the migrating group within the subtree 150. At step 1385, each EC node in the subtree 150 reperforms the affiliation process with the DC node 160A. For example, each EC node can be triggered to reperform the affiliation process in response to receiving the parent address list from the parent node, or in response to receiving a modified parent address list from the parent node. The method 1300 then ends.

Loop Detection During Normal Operations

The loop management processes also include processes for loop detection during normal operations of the BPD subtree 150, outside of a node migration process. A node loop can be inadvertently created in the subtree 150 due to various reasons, such as hardware malfunctions, software errors, and the like. Each node in the subtree 150 can be configured by the custom network protocol to periodically check for node loops, and if found, to terminate/destroy the detected node loop. Therefore, while loop avoidance processes attempt to prevent/avoid the initial formation of node loops, the loop detection process detects and destroys any node loops that have been formed in the subtree 150.

As discussed above in relation to the address list process, each BPD node is configured by the custom network protocol to periodically transmit (e.g., every 5 minutes) its address list to each child node. In these embodiments, each EC node is configured to initiate a loop detection process in response to receiving the parent address list from the parent node. An EC node can determine whether the EC node is included in a node loop based on the MAC address of the EC node and the received parent address list. In particular, if the MAC address of the EC node is included in the received parent address list, the EC node determines that a node loop has been formed that includes the EC node and the parent node. If the MAC address of the EC node is not included in the received parent address list, the EC node determines that a node loop has not been formed that includes the EC node and the parent node.

When a loop has not been formed, the parent address list received from a parent node only includes ascendant nodes of the parent node and does not include any descendant nodes of the parent node. A child node that receives the parent address list is a descendant node of the parent node. Therefore, if the child node that receives the parent address list is included in the parent address list, the child node is both an ascendant node of the parent node (as indicated by the parent address list) and a descendant node of the parent node, which indicates that a loop has been formed that includes the child node and the parent node. If so, the child node is configured to force a disconnection with the parent node, which effectively destroys the node loop. The child node then performs a discovery process to search for a new parent node.

Figure 14:
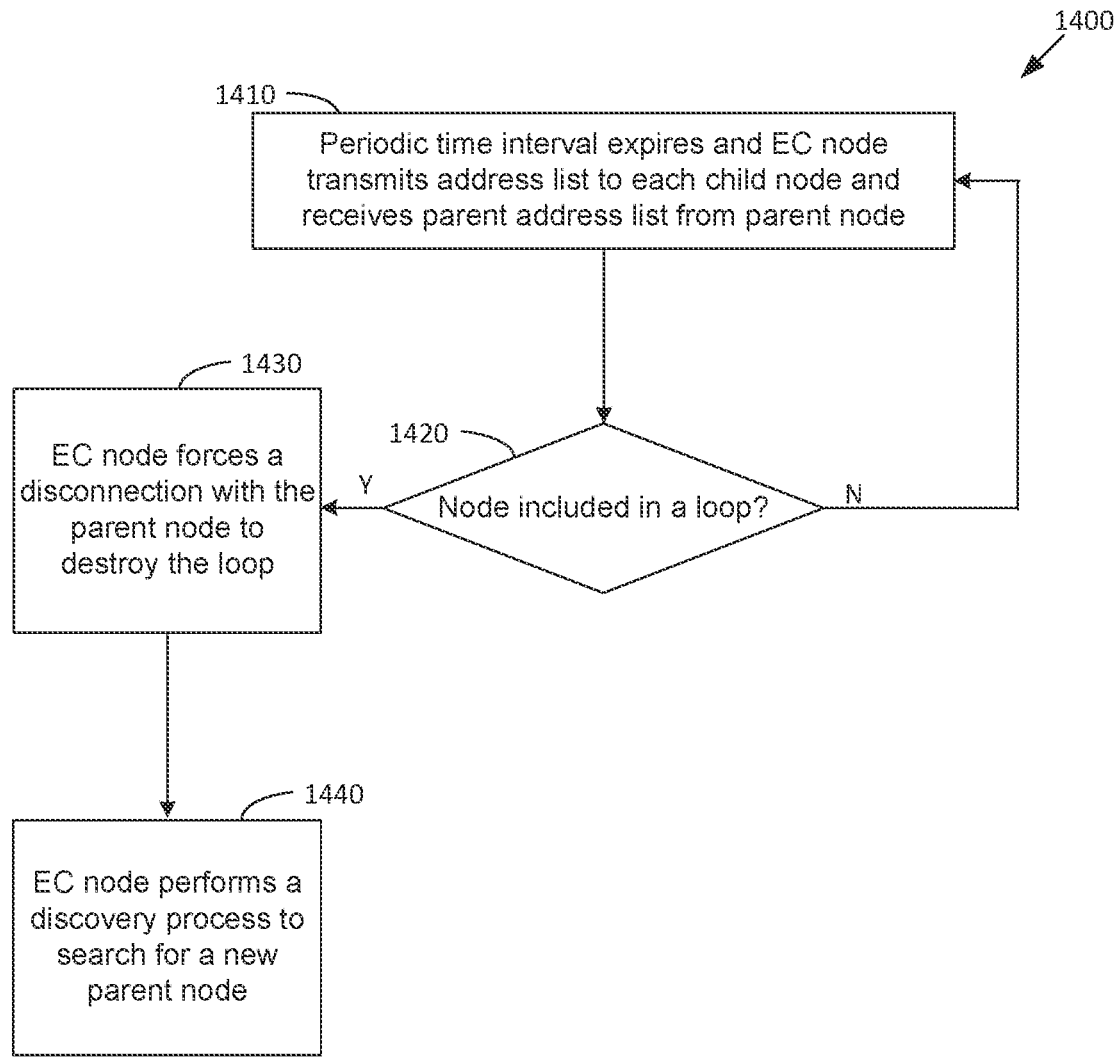
FIG. 14 sets forth a flow diagram of method steps for loop detection during normal operations within a BPD subtree, according to various embodiments.

FIG. 14 sets forth a flow diagram of method steps for loop detection during normal operations within a BPD subtree, according to various embodiments. Although the method steps are described in conjunction with the systems of FIGS. 1-4 and 9-12, persons skilled in the art will understand that any system can be configured to perform the method steps in any order.

A method 1400 begins at step 1410, when a periodic time interval expires (such as 5 minutes), and an EC node in the subtree 150 is triggered/initiated to transmit its address list to each child node and to receive a parent address list from the parent node. At step 1420, the EC node determines whether or not the EC node is included in a node loop based on the MAC address of the EC node and the received parent address list. If the MAC address of the EC node is not included in the parent address list, the EC node determines that a node loop has not been formed, and the method 1400 proceeds to step 1410. If the MAC address of the EC node is included in the parent address list, the EC node determines that a node loop has been formed that includes the EC node and the parent node, and the method 1400 proceeds to step 1430. In response, at step 1430, the EC node forces a disconnection with the parent node, which terminates/destroys the node loop. At step 1440, the EC node performs a discovery process to search for a new parent node. The method 1400 then ends. Each EC node in the subtree 150 is configured to periodically perform the method 1400 of FIG. 14.

In sum, the disclosed techniques apply to a system of networked devices/nodes, where at least some devices/nodes are BPD nodes. Conventional network protocols implemented by a conventional wireless network are configured for MPD nodes. Among other things, conventional network protocols permit large and complex subtrees that are difficult to manage by a root BPD node, as well as define complex functions that expend a significant amount of energy when executed by BPD nodes. To address these issues, various embodiments include a custom network protocol that is configured and optimized for BPD nodes and BPD subtrees within a wireless network. In particular, the custom network protocol permits only smaller and simpler subtrees relative to conventional network protocols. As a result, the custom network protocol can also define various functions that are less complex relative to the corresponding functions defined in conventional network protocols. For example, the simplified functions defined by the custom network protocol can include management of the subtree, adding a node to the subtree, routing messages within the subtree, and loop management within the subtree.

At least one technical advantage of the disclosed techniques relative to the prior art is that, with the disclosed techniques, a custom network protocol configured and optimized for BPD nodes can be implemented within a wireless network. Among other things, the custom network protocol permits smaller and simpler subtrees of nodes to be set up within the wireless network relative to what is permitted by conventional network protocols. As a result, BPD nodes can function properly as the root nodes of the subtrees formed within the wireless network and can manage and route messages to and from the subtrees using less power than required under conventional network protocols. Another technical advantage of the disclosed techniques is that, because the custom network protocol permits smaller and simpler subtrees of BPD nodes within the wireless network, the custom network protocol also defines node functions, such as discovery, messaging and loop management functions, that are less complex than those defined under conventional network protocols. As a result, the BPD nodes of a given subtree can execute those functions using less power than required under conventional network protocols. These technical advantages represent one or more technological improvements over prior art approaches.

Aspects of the subject matter described herein are set out in the following numbered clauses.

1. In some embodiments, a computer-implemented method for performing node loop operations within a wireless network, the method comprising: identifying a network address that is associated with a first battery powered device (BPD) node included in a subtree of BPD nodes within the wireless network; identifying an address list that is associated with a second BPD node included in the subtree of BPD nodes, wherein the address list includes a node path between the second BPD node and a root node of the subtree of BPD nodes; and determining whether the first BPD node and the second BPD node are included in a potential node loop or a formed node loop based on the network address associated with the first BPD node and the address list associated with the second BPD node.

2. The computer-implemented method of clause 1, wherein: the first BPD node comprises a discovering node; and the second BPD node comprises a potential parent node that receives a discovery request message from the first BPD node.

3. The computer-implemented method of any of clauses 1-2, wherein determining whether the first BPD node and the second BPD node are included in the potential node loop or the formed node loop comprises determining that the first BPD node and the second BPD node are included in the potential node loop upon determining that the address list associated with the second BPD node includes the network address associated with the first BPD node.

4. The computer-implemented method of any of clauses 1-3, further comprising, in response to determining that the address list associated with the second BPD node includes the network address associated with the first BPD node, preventing the potential node loop from being formed.

5. The computer-implemented method of any of clauses 1-4, wherein preventing the potential node loop from being formed comprises causing the second BPD node to not respond to the discovery request message received from the first BPD node.

6. The computer-implemented method of any of clauses 1-5, wherein determining whether the first BPD node and the second BPD node are included in the potential node loop or the formed node loop comprises determining that the first BPD node and the second BPD node are not included in the potential node loop or the formed node loop upon determining that the address list associated with the second BPD node does not include the network address associated with the first BPD node.

7. The computer-implemented method of any of clauses 1-6, further comprising, in response to determining that the address list associated with the second BPD node does not include the network address associated with the first BPD node, causing the second BPD node to respond to the discovery request message received from the first BPD node.

8. The computer-implemented method of any of clauses 1-7, wherein the first BPD node comprises a child node of the second BPD node.

9. The computer-implemented method of any of clauses 1-8, wherein determining whether the first BPD node and the second BPD node are included in the potential node loop or the formed node loop comprises determining that the first BPD node and the second BPD node are included in the formed node loop upon determining that the address list associated with the second BPD node includes the network address associated with the first BPD node.

10. In some embodiments, one or more non-transitory computer-readable media storing program instructions that, when executed by one or more processors, cause the one or more processors to perform node-based operations by performing the steps of: identifying a network address that is associated with a first battery powered device (BPD) node included in a subtree of BPD nodes within the wireless network; identifying an address list that is associated with a second BPD node included in the subtree of BPD nodes, wherein the address list includes a node path between the second BPD node and a root node of the subtree of BPD nodes; and determining whether the first BPD node and the second BPD node are included in a potential node loop or a formed node loop based on the network address associated with the first BPD node and the address list associated with the second BPD node.

11. The one or more non-transitory computer-readable media of clause 10, wherein: the first BPD node comprises a discovering node; and the second BPD node comprises a potential parent node that receives a discovery request message from the first BPD node.

12. The one or more non-transitory computer-readable media of any of clauses 10-11, wherein determining whether the first BPD node and the second BPD node are included in the potential node loop or the formed node loop comprises determining that the first BPD node and the second BPD node are included in the potential node loop upon determining that the address list associated with the second BPD node includes the network address associated with the first BPD node.

13. The one or more non-transitory computer-readable media of any of clauses 10-12, further comprising, in response to determining that the address list associated with the second BPD node includes the network address associated with the first BPD node, preventing the potential node loop from being formed by causing the second BPD node to not respond to the discovery request message received from the first BPD node.

14. The one or more non-transitory computer-readable media of any of clauses 10-13, wherein the first BPD node comprises a child node of the second BPD node that periodically transmits the address list to the first BPD node.

15. The one or more non-transitory computer-readable media of any of clauses 10-14, wherein determining whether the first BPD node and the second BPD node are included in the potential node loop or the formed node loop comprises determining that the first BPD node and the second BPD node are included in the formed node loop upon determining that the address list associated with the second BPD node includes the network address associated with the first BPD node.

16. The one or more non-transitory computer-readable media of any of clauses 10-15, further comprising, in response to determining that the address list associated with the second BPD node includes the network address associated with the first BPD node, disconnecting the first BPD node from the second BPD node.

17. The one or more non-transitory computer-readable media of any of clauses 10-16, wherein; the network address associated with the first BPD node comprises a media access control (MAC) of the first BPD node; and the address list associated with the second BPD node comprises a sequence of MAC addresses corresponding to a sequence of nodes between the second BPD node and the root node of the subtree of BPD nodes.

18. In some embodiments, a first battery powered device (BPD) node that resides within a wireless network, the first BPD node comprising: a memory storing instructions; and a processor that is coupled to the memory and, when executing the instructions: identify a network address that is associated with a second BPD node included in a subtree of BPD nodes within the wireless network; identifying an address list that is associated with the first BPD node included in the subtree of BPD nodes, wherein the address list includes a node path between the first BPD node and a root node of the subtree of BPD nodes; and determine whether the first BPD node and the second BPD node are included in a potential node loop or a formed node loop based on the network address associated with the second BPD node and the address list associated with the first BPD node.

19. The first BPD node of clause 18, wherein: the second BPD node comprises a discovering node; and the first BPD node comprises a potential parent node that receives a discovery request message from the discovering node.

20. The first BPD node of any of clauses 18-19, wherein determining whether the first BPD node and the second BPD node are included in the potential node loop or the formed node loop comprises determining that the first BPD node and the second BPD node are included in the potential node loop upon determining that the address list associated with the first BPD node includes the network address associated with the second BPD node.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
    receiving, by a first node included in a subtree of nodes within a wireless network, a discovery request from a second node included in the wireless network;
    determining, by the first node, that an address associated with the second node is not included in a first address list that includes addresses of nodes along a node path between the first node and a root node of the subtree of nodes; and
    sending, by the first node in response to the determining, a response to the discovery request.

2. The method of claim 1, further comprising:
    receiving, by the first node, a second address list from a third node that is a parent to the second node in the subtree of nodes; and
    generating, by the first node, the first address list based on the second address list and an address associated with the third node.

3. The method of claim 2, wherein the second address list includes addresses of nodes along a node path between the third node and the root node of the subtree of nodes.

4. The method of claim 2, further comprising:
    determining, by the first node, whether an address associated with the first node is included in the second address list; and
    disconnecting, by the first node in response to determining that the address associated with the first node is included in the second address list, from the third node.

5. The method of claim 4, wherein the address associated with the first node being included in the second address list indicates that a loop has formed in the subtree of nodes.

6. The method of claim 1, wherein the response to the discovery request includes an address associated with the first node and a number of node hops between the first node and the root node.

7. The method of claim 1, further comprising:
performing, by the first node, an affiliation process with the second node; and
connecting, by the first node in response to the affiliation process being successful, to the second node.

8. The method of claim 7, further comprising periodically sending, by the first node, the first address list to the second node.

9. The method of claim 7, wherein performing the affiliation process comprises at least one of determining whether connecting to the second node will exceed a node count limit for the subtree of nodes or determining whether connecting to the second node will cause the second node to be more node hops away from the root node that a node hop limit.

10. The method of claim 7, further comprising disconnecting, by the first node in response to the first node losing a connection with a third node for longer than a threshold period of time, from the second node, wherein the third node is a parent to the first node in the subtree of nodes.

11. One or more non-transitory computer-readable media storing program instructions that, when executed by one or more processors associated with a first network device included in a subtree of network devices included in a mesh network, cause the one or more processors to perform operations comprising:
receiving a discovery message from a second network device included in the mesh network;
determining whether a first list of addresses includes a network address of the second network device, the first list of address list including network addresses of network devices in the subtree of network devices located along a path between the first network device and a root network device of the subtree of network devices; and
in response to determining that the first list of address does not include the network address of the second network device, transmitting a response message to the second network device.

12. The one or more non-transitory computer-readable media of claim 11, wherein the operations further comprise:
receiving a second list of addresses from a parent network device of the first network device in the subtree of network devices, the second list of addresses including network addresses of network devices on a network path from the parent network device to the root network device; and
determining the first list of addresses by adding a network address of the parent network device to the second list of addresses.

13. The one or more non-transitory computer-readable media of claim 12, wherein the operations further comprise:
determining whether the second list of addresses includes a network address of the first network device; and
in response to determining that the second list of addresses includes the network address of the first network device, terminating a connection with the parent network device.

14. The one or more non-transitory computer-readable media of claim 11, wherein the response message includes a network address of the first network device and a hop count for a path between the first network device and the root network device.

15. The one or more non-transitory computer-readable media of claim 11, wherein the operations further comprise:
establishing a connection with the second network device; and
transmitting the first list of addresses to the second network device.

16. The one or more non-transitory computer-readable media of claim 11, wherein the operations further comprise:
receiving, a second discovery message from a third network device included in the mesh network;
determining whether the first list of addresses includes a network address of the third network device; and
in response to determining that the first list of addresses includes the network address of the third network device, not providing a response message to the discovery message.

17. A first battery powered device (BPD) in a wireless network, the first BPD comprising:
one or more processors, and
a memory storing instructions that, when executed by the one or more processors, cause the one or more processors to perform operations comprising:
receiving a message from a second BPD included in the wireless network, the message indicating that the second BPD is performing a discovery process to identify a parent BPD;
determining whether an address of the second BPD is included in a first list of addresses of BPDs on a route from the first BPD to a root BPD of a subtree of the wireless network; and
in response to determining that the address of the second BPD is not included in the first list of addresses, sending a response to the second BPD.

18. The first BPD of claim 17, wherein the operations further comprise:
receiving, from a third BPD that is a parent to the first BPD in the subtree of the wireless network, a second list of addresses of BPDs on a route from the third BPD to the root BPD of the subtree of the wireless network; and
updating the first list of addresses to include the addresses in the second list of addresses and an address of the third BPD.

19. The first BPD of claim 18, wherein the operations further comprise:
determining whether an address of the first BPD is included in the second list of addresses; and
in response to determining that the address of the first BPD is included in the second list of addresses, disconnecting from the third BPD.

20. The first BPD of claim 17, wherein the operations further comprise:
connecting with the second BPD; and
sending the first list of addresses to the second BPD.

* * * * *